US009521422B2

(12) United States Patent
Tanizawa et al.

(10) Patent No.: US 9,521,422 B2
(45) Date of Patent: *Dec. 13, 2016

(54) ENCODING DEVICE, DECODING DEVICE, ENCODING METHOD, AND DECODING METHOD FOR EFFICIENT CODING

(71) Applicant: Kabushiki Kaisha Toshiba, Tokyo (JP)

(72) Inventors: Akiyuki Tanizawa, Kanagawa (JP); Takeshi Chujoh, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 559 days.

This patent is subject to a terminal disclaimer.

(21) Appl. No.: 14/026,713

(22) Filed: Sep. 13, 2013

(65) Prior Publication Data
US 2014/0056357 A1 Feb. 27, 2014

Related U.S. Application Data

(63) Continuation of application No. PCT/JP2011/073852, filed on Oct. 17, 2011.

(51) Int. Cl.
*H04N 7/12* (2006.01)
*H04N 19/463* (2014.01)
(Continued)

(52) U.S. Cl.
CPC .......... *H04N 19/463* (2014.11); *H04N 19/105* (2014.11); *H04N 19/44* (2014.11); *H04N 19/51* (2014.11)

(58) Field of Classification Search
CPC ...... H04N 19/176; H04N 19/61; H04N 19/70; H04N 19/51; H04N 19/139; H04N 19/107; H04N 19/423; H04N 19/573
(Continued)

(56) References Cited

U.S. PATENT DOCUMENTS 7,450,643 B2 11/2008 Chujoh et al.
7,616,691 B2 11/2009 Chujoh et al.
(Continued)

FOREIGN PATENT DOCUMENTS

EP  2 375 754 A1  10/2011
JP  2004-7377     1/2004
(Continued)

OTHER PUBLICATIONS

Philippe Bordes, "Weighted Prediction" JCT-VC of ITU-T SGI 6 WP3 and ISO/I EC JTC1/SC29/WG11, 6th Meeting, Torino, IT, Jul. 2011.*

(Continued)

*Primary Examiner* — Gims Philippe
*Assistant Examiner* — Ayman Abaza
(74) *Attorney, Agent, or Firm* — Oblon, McClelland, Maier & Neustadt, L.L.P.

(57) ABSTRACT

According to an embodiment, an encoding device includes an index setting unit, an index reconfiguring unit, and an entropy encoding unit. The index setting unit sets an index and a weighting factor. The index represents information of a reference image. The index reconfiguring unit predicts a reference value of the weighting factor. The reference value indicates a factor to be set if a difference of pixel value between a reference image and a target image to be encoded is less than or equal to a specific value. The entropy encoding unit encodes a difference value between the weighting factor and the reference value.

17 Claims, 21 Drawing Sheets

(51) Int. Cl.
*H04N 19/105* (2014.01)
*H04N 19/51* (2014.01)
*H04N 19/44* (2014.01)

(58) Field of Classification Search
USPC .................................................. 375/240.16
See application file for complete search history.

(56) References Cited

U.S. PATENT DOCUMENTS

| | | |
|---|---|---|
| 2003/0215014 A1 | 11/2003 | Koto et al. |
| 2004/0057523 A1 | 3/2004 | Koto et al. |
| 2004/0141615 A1 | 7/2004 | Chujoh et al. |
| 2005/0243931 A1 | 11/2005 | Yasuda et al. |

FOREIGN PATENT DOCUMENTS

| | | | |
|---|---|---|---|
| JP | 2004-7379 | 1/2004 | |
| JP | 2007-81518 | 3/2007 | |
| JP | EP 2375754 A1 * | 10/2011 | ........... H04N 19/176 |
| KR | 10-2004-0028913 A | 4/2004 | |
| WO | WO 2006/128072 A2 | 11/2006 | |

OTHER PUBLICATIONS

U.S. Appl. No. 14/026,727, filed Sep. 13, 2013, Tanizawa, et al.
Combined Taiwanese Office Action and Search Report issued Sep. 4, 2014 in Patent Application No. 101101751 (with English language translation).
Australian Office Action issued Nov. 20, 2014, in Australian Patent Application No. 2011379259.
Extended European Search Report issued May 4, 2015 in Patent Application No. 11874283.2.
Jill M. Boyce, "Weighted prediction in the H.264/MPEG AVC video coding standard" Proceedings IEEE International Symposium on Circuits and Systems, XP10719383A, May 23, 2004, pp. III-789-III-792.
Office Action issued May 22, 2015 in Korean Patent Application No. 10-2014-7005644 (with English-language translation).
Canadian Office Action and Search Report issued Jun. 10, 2015 in Patent Application No. 2,847,299.
International Search Report and Written Opinion mailed Jan. 17, 2012, in International Application No. PCT/JP2011/073852.
Sugimoto et al., "Description of video coding technology proposal by Mitsubishi Electric," Joint Collaborative Team on Video Coding (JCT-VC) of ITU-T SG16 WP3 and ISO/IEC JTCI/SC29/WG11, $1^{st}$ Meeting, Apr. 2010, 17 pages.
Sordes, "Weighted Prediction," Joint Collaborative Team on Video Coding (JCT-VC) of ITU-T SG16 WP3 and ISO/IEC JTCI/SC29/WG11, $6^{th}$ Meeting, Jul. 2011, 14 pages.
Combined Chinese Office Action and Search Report issued Jul. 4, 2016 in Patent Application No. 201180073122.8 (with English Translation).
Office Action issued Sep. 28, 2015 in Russian Patent Application No. 2014107490 (with English language translation).
Office Action issued Jan. 27, 2016 in Korean Patent Application No. 10-2014-7005644 (with English language translation).
Combined Taiwanese Office Action and Search Report issued Apr. 12, 2016 in Patent Application No. 104113292 (with English language translation).
Office Action issued May 27, 2016 in Mexican Patent Application No. MX/a/2016/000809 (with English language translation).
Office Action issued Sep. 2. 2016 in Korean Patent Application No. 2015-7030535 (with English translation).

* cited by examiner

FIG.8A

| LIST NUMBER | 0 | | | | | | |
|---|---|---|---|---|---|---|---|
| REFERENCE NUMBER | 0 | 1 | 2 | 3 | 4 | ... | N |
| WP APPLICATION FLAG | WP_flag[0] | WP_flag[1] | WP_flag[2] | WP_flag[3] | WP_flag[4] | ... | WP_flag[N] |
| WEIGHTING FACTOR | Weight[0] | Weight[1] | Weight[2] | Weight[3] | Weight[4] | ... | Weight[N] |
| OFFSET | Offset[0] | Offset[1] | Offset[2] | Offset[3] | Offset[4] | ... | Offset[N] |

FIG.8B

| LIST NUMBER | 1 | | | | | | |
|---|---|---|---|---|---|---|---|
| REFERENCE NUMBER | 0 | 1 | 2 | 3 | 4 | ... | N |
| WP APPLICATION FLAG | WP_flag[0] | WP_flag[1] | WP_flag[2] | WP_flag[3] | WP_flag[4] | ... | WP_flag[N] |
| WEIGHTING FACTOR | Weight[0] | Weight[1] | Weight[2] | Weight[3] | Weight[4] | ... | Weight[N] |
| OFFSET | Offset[0] | Offset[1] | Offset[2] | Offset[3] | Offset[4] | ... | Offset[N] |

FIG.10

| pic_parameter_set_rbsp( ) { | Descriptor |
|---|---|
|    pic_parameter_set_id | u (8) |
|    seq_parameter_set_id | u (8) |
|    ... | |
|    num_ref_idx_l0_default_active_minus1 | ue (v) |
|    num_ref_idx_l1_default_active_minus1 | ue (v) |
|    weighted_pred_flag | u (1) |
|    weighted_bipred_idc | u (2) |
|    ... | |
|    rbsp_trailing_bits( ) | |
| } | |

FIG.11

| slice_header( ) { | Descriptor |
|---|---|
|    ... | |
|    slice_type | ue (v) |
|    pic_parameter_set_id | ue (v) |
|    ... | |
|    if( slice_type == P || slice_type == B ) { | |
|       num_ref_idx_active_override_flag | u (1) |
|       if( num_ref_idx_active_override_flag ) { | |
|          num_ref_idx_l0_active_minus1 | ue (v) |
|          if( slice_type == B ) | |
|             num_ref_idx_l1_active_minus1 | ue (v) |
|       } | |
|    } | |
|    ... | |
|    if( ( weighted_pred_flag && ( slice_type == P ) ) ||<br>      ( weighted_bipred_idc == 1 && slice_type == B ) ) | |
|       pred_weight_table( ) | |
|    ... | |
| } | |

FIG.12

| pred_weight_table( ) { | Descriptor |
|---|---|
|   luma_log2_weight_denom | ue (v) |
|   if( chroma_format_idc != MONO_IDX) | |
|     chroma_log2_weight_denom | ue (v) |
|   for( i = 0; i <= num_ref_idx_l0_active_minus1; i++ ) { | |
|     luma_weight_l0_flag | u (1) |
|     if( luma_weight_l0_flag ) { | |
|       luma_weight_l0[ i ] | se (v) |
|       luma_offset_l0[ i ] | se (v) |
|     } | |
|     if ( chroma_format_idc != MONO_IDX) { | |
|       chroma_weight_l0_flag | u (1) |
|       if( chroma_weight_l0_flag ) | |
|         for( j =0; j < COLOR_COMP - 1; j++ ) { | |
|           chroma_weight_l0[ i ][ j ] | se (v) |
|           chroma_offset_l0[ i ][ j ] | se (v) |
|         } | |
|     } | |
|   } | |
| if( slice_type = = B_SLICE ) | |
|   for( i = 0; i <= num_ref_idx_l1_active_minus1; i++ ) { | |
|     luma_weight_l1_flag | u (1) |
|     if( luma_weight_l1_flag ) { | |
|       luma_weight_l1[ i ] | se (v) |
|       luma_offset_l1[ i ] | se (v) |
|     } | |
|     if( chroma_format_idc != MONO_IDX ) { | |
|       chroma_weight_l1_flag | u (1) |
|       if( chroma_weight_l1_flag ) { | |
|         for( j =0; j < COLOR_COMP - 1; j++ ) { | |
|           chroma_weight_l1[ i ][ j ] | se (v) |
|           chroma_offset_l1[ i ][ j ] | se (v) |
|         } | |
|       } | |
|     } | |
|   } | |
|   } | |
| } | |

FIG.13

| pred_weight_table( ) { | Descriptor |
|---|---|
|   luma_log2_weight_denom | ue (v) |
|   if( chroma_format_idc != MONO_IDX) | |
|     delta_chroma_log2_weight_denom | ue (v) |
|   for( i = 0; i <= num_ref_idx_l0_active_minus1; i++ ) { | |
|     luma_weight_l0_flag | u (1) |
|     if( luma_weight_l0_flag ) { | |
|       delta_luma_weight_l0[ i ] | se (v) |
|       delta_luma_offset_l0[ i ] | se (v) |
|     } | |
|     if ( chroma_format_idc != MONO_IDX) { | |
|       chroma_weight_l0_flag | u (1) |
|       if( chroma_weight_l0_flag ) | |
|         for( j =0; j < COLOR_COMP - 1; j++ ) { | |
|           delta_chroma_weight_l0[ i ][ j ] | se (v) |
|           delta_chroma_ offset_l0[ i ][ j ] | se (v) |
|         } | |
|     } | |
|   } | |
|   if( slice_type = = B_SLICE ) | |
|     for( i = 0; i <= num_ref_idx_l1_active_minus1; i++ ) { | |
|       luma_weight_l1_flag | u (1) |
|       if( luma_weight_l1_flag ) { | |
|         delta_luma_weight_l1[ i ] | se (v) |
|         delta_luma_ offset_l1[ i ] | se (v) |
|       } | |
|       if( chroma_format_idc != MONO_IDX ) { | |
|         chroma_weight_l1_flag | u (1) |
|         if( chroma_weight_l1_flag ) { | |
|           for( j =0; j < COLOR_COMP - 1; j++ ) { | |
|             delta_chroma_weight_l1[ i ][ j ] | se (v) |
|             delta_chroma_ offset_l1[ i ][ j ] | se (v) |
|           } | |
|         } | |
|       } | |
|     } | |
|   } | |
| } | |

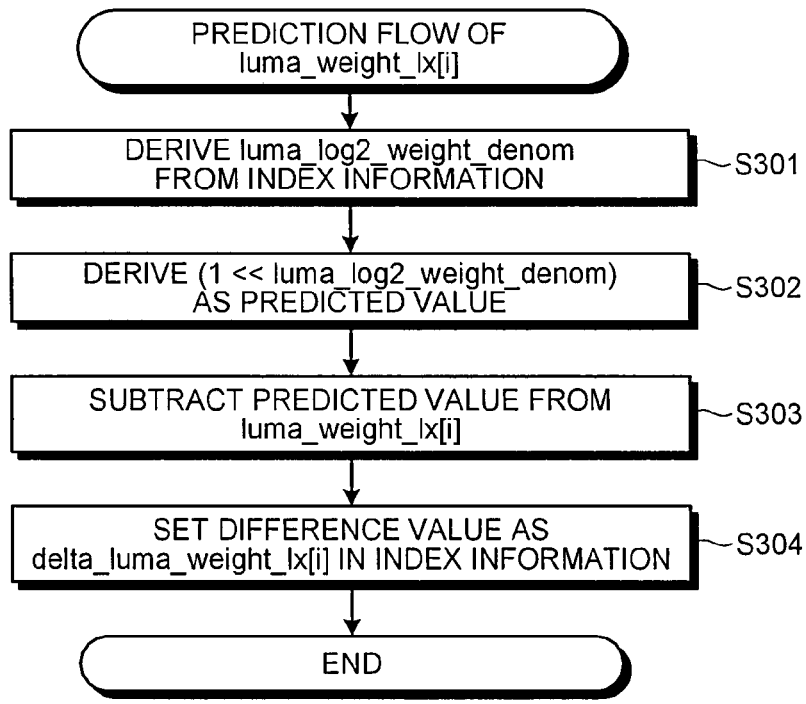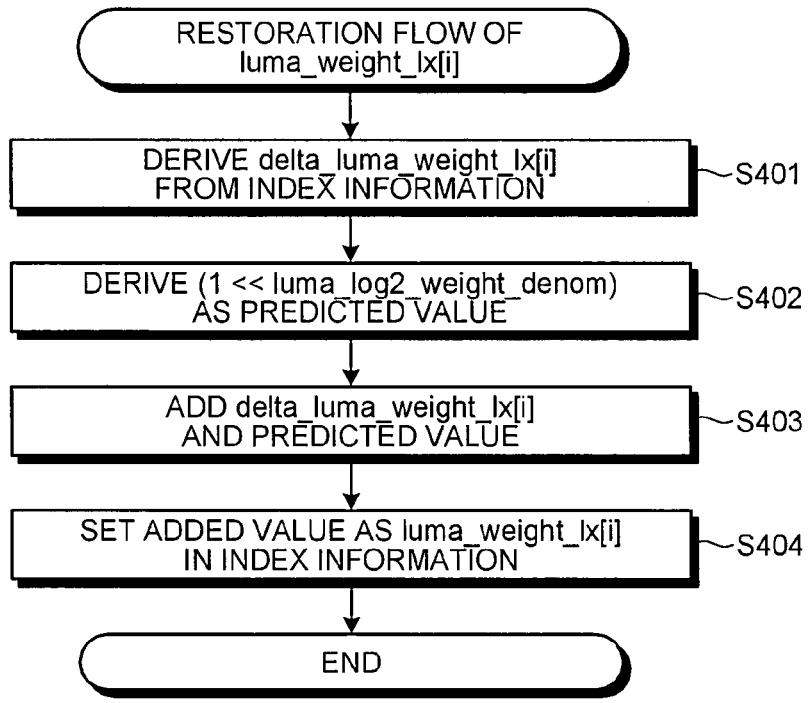

ENCODING DEVICE, DECODING DEVICE, ENCODING METHOD, AND DECODING METHOD FOR EFFICIENT CODING

CROSS-REFERENCE TO RELATED APPLICATIONS

This application is a continuation of PCT international Application Ser. No. PCT/JP2011/073852, filed on Oct. 17, 2011, which designates the United States; the entire contents of which are incorporated herein by reference.

FIELD

Embodiments described herein relate generally to an encoding method and a decoding method.

BACKGROUND

In recent years, a method of encoding an image with markedly improved coding efficiency is recommended as ITU-T REC. H.264 and ISO/IEC 14496-10 (hereinafter, referred to as "H.264") in cooperation of ITU-T (International Telecommunication Union Telecommunication Standardization Sector) and ISO (International Organization for Standardization)/IEC (International Electrotechnical Commission).

In H.264, an inter-prediction coding system is disclosed in which redundancy in the time direction is eliminated to achieve high coding efficiency by making a motion compensation prediction of fractional precision using a coded image as a reference image.

In addition, a system is proposed in which a moving image including a fading or dissolving effect is encoded with efficiency higher than that of an inter-prediction coding system according to ISO/IEC MPEG (Moving Picture Experts Group)-1, 2, 4. In this system, a motion compensation prediction of fractional precision is made for an input moving image having luminance and two color differences as frames for predicting a change in the brightness in the time direction. Then, by using an index representing a combination of a reference image, a weighting factor for each luminance and two color differences, and an offset for each luminance and two color differences, a predicted image is multiplied by the weighting factor, and the offset is added thereto.

However, in the conventional technology as described above, since the index is coded with being maintained as direct values, the coding efficiency is reduced. An object to be solved by the present invention is to provide an encoding method and a decoding method capable of improving the coding efficiency.

BRIEF DESCRIPTION OF THE DRAWINGS

FIG. 8A is a diagram that illustrates an example of WP parameter information according to the first embodiment;

FIG. 8B is a diagram that illustrates an example of the WP parameter information according to the first embodiment;

FIG. 10 is a diagram that illustrates an example of a picture parameter set syntax according to the first embodiment;

FIG. 11 is a diagram that illustrates an example of a slice header syntax according to the first embodiment;

FIG. 12 is a diagram that illustrates an example of a pred weight table syntax according to the first embodiment;

FIG. 13 is a diagram that illustrates an example of a syntax configuration explicitly representing a prediction method according to the first embodiment;

FIG. 16 is a flowchart that illustrates an example of a weighting factor predicting process according to the first embodiment;

FIG. 17 is a flowchart that illustrates an example of a weighting factor restoring process according to the first embodiment;

DETAILED DESCRIPTION

According to an embodiment, an encoding device includes: an index setting unit sets an index that represents information of a reference image and a weighting factor; an index reconfiguring unit predicts a reference value of the weighting factor, wherein the reference value indicates a factor to be set if a difference of pixel value between a reference image and a target image to be encoded is less than or equal to a specific value; and an entropy encoding unit encodes a difference value between the weighting factor and the reference value.

Hereinafter, embodiments will be described in detail with reference to the accompanying drawings. An encoding device and a decoding device according to each embodiment presented below may be implemented by hardware such as an LSI (Large-Scale Integration) chip, a DSP (Digital Signal Processor), or an FPGA (Field Programmable Gate Array). In addition, an encoding device and a decoding device according to each embodiment presented below may be implemented by causing a computer to execute a program, in other words, by software. In description presented below, a term "image" may be appropriately replaced by a term such as a "video", a "pixel", an "image signal", a "picture", or "image data".

First Embodiment

In a first embodiment, an encoding device encoding a moving image will be described.

Figure 1:
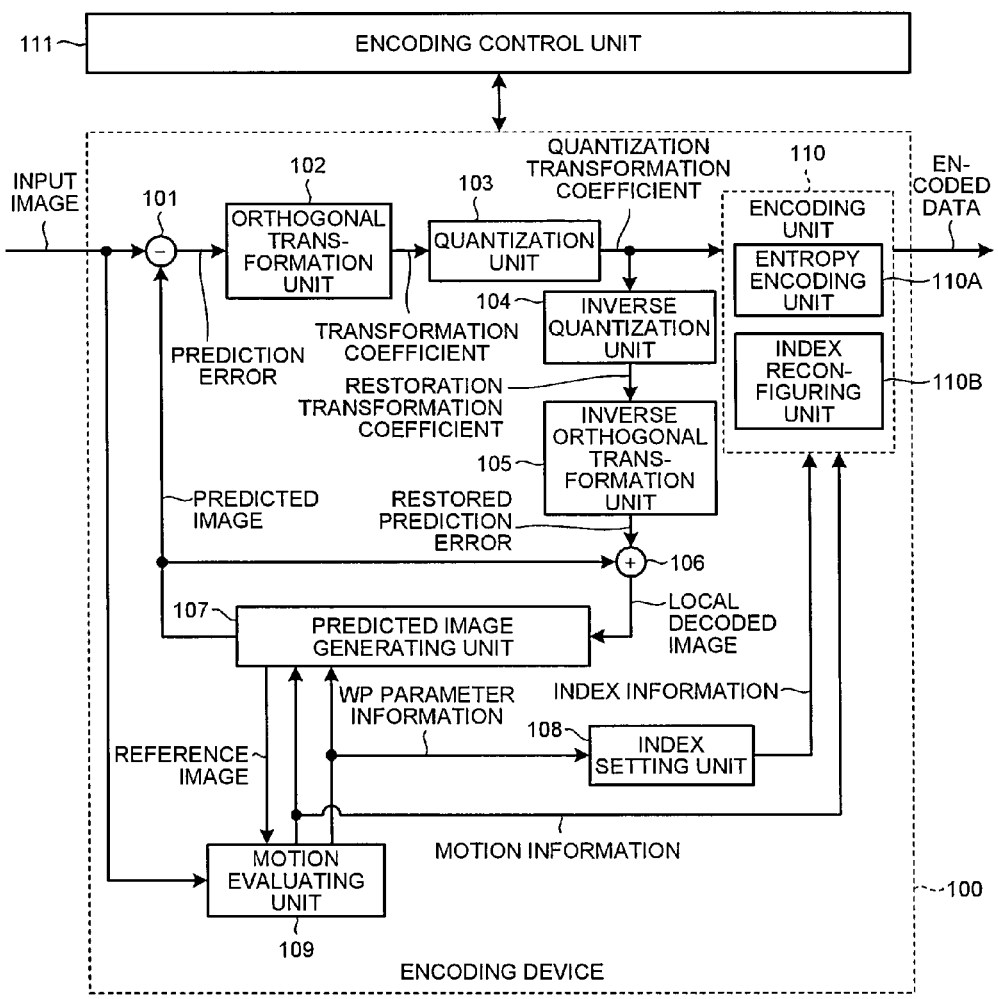
FIG. 1 is a block diagram that illustrates an example of an encoding device according to a first embodiment.

FIG. 1 is a block diagram that illustrates an example of the configuration of an encoding device 100 according to a first embodiment.

The encoding device 100 divides each frame or each field configuring an input image into a plurality of pixel blocks and performs predicted encoding of the divided pixel blocks using encoding parameters input from an encoding control unit 111, thereby generating a predicted image. Then, the encoding device 100 generates a prediction error by subtracting the predicted image from the input image divided into the plurality of pixels, generates encoded data by performing orthogonal transformation, and quantization, and then entropy encoding for the generated prediction error, and outputs the generated encoded data.

The encoding device 100 performs predicted encoding by selectively applying a plurality of prediction modes that are different from each other in at least one of the block size of the pixel block and the method of generating a predicted image. The method of generating a predicted image can be largely divided into two types including an intra-prediction in which a prediction is made within an encoding target frame and an inter-prediction in which a motion compensated prediction is made using one or more reference frames of different time points. The intra-prediction is also called an internal-screen prediction, an internal-frame prediction, or the like, and the inter-prediction is also called an inter-screen prediction, an inter-frame prediction, a motion compensated prediction, or the like.

Figure 2:
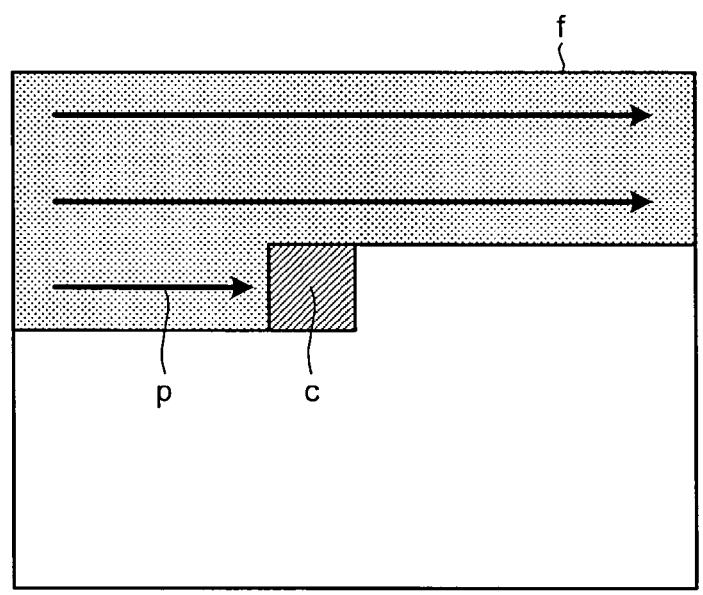
FIG. 2 is an explanatory diagram that illustrates an example of a predicted coding sequence for a pixel block according to the first embodiment.

FIG. 2 is an explanatory diagram that illustrates an example of a predicted coding sequence for a pixel block according to the first embodiment. In the example illustrated in FIG. 2, the encoding device 100 performs predicted encoding from the upper left side toward the lower right side in the pixel block. Thus, in an encoding processing target frame f, on the left side and the upper side of the encoding target pixel block c, pixel blocks p that have been completed to be encoded are located. Hereinafter, for the simplification of description, while it is assumed that the encoding device 100 performs predicted encoding in order illustrated in FIG. 2, the order in the predicted encoding is not limited thereto.

The pixel block represents a unit for processing an image and, for example, a block having an M×N size (here, M and N are natural numbers), a coding tree block, a macro block, a sub-block, one pixel, or the like corresponds thereto. In description presented below, basically, the pixel block is used as the meaning of a coding tree block but may be used as a different meaning. For example, in description of a prediction unit, a pixel block is used as the meaning of a pixel block of the prediction unit. A block may be referred to as a unit or the like. For example, a coding block may be referred to as a coding unit.

Figure 3A:
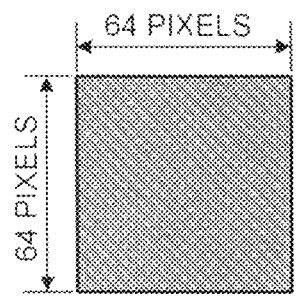
FIG. 3A is a diagram that illustrates an example of the block size of a coding tree block according to the first embodiment.

FIG. 3A is a diagram that illustrates an example of the size of a coding tree block according to the first embodiment. The coding tree block, typically, is a pixel block of 64×64 as illustrated in FIG. 3A. However, the coding tree block is not limited thereto but may be a pixel block of 32×32, a pixel block of 16×16, a pixel block of 8×8, a pixel block of 4×4, or the like. Here, the coding tree block may not be a square but, for example, may be a pixel block of an M×N size (here, M≠N).

Figure 3B:
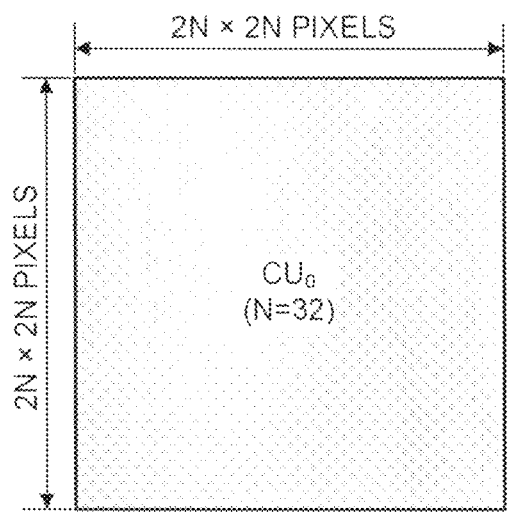
FIG. 3B is a diagram that illustrates a specific example of the coding tree block according to the first embodiment.
Figure 3C:
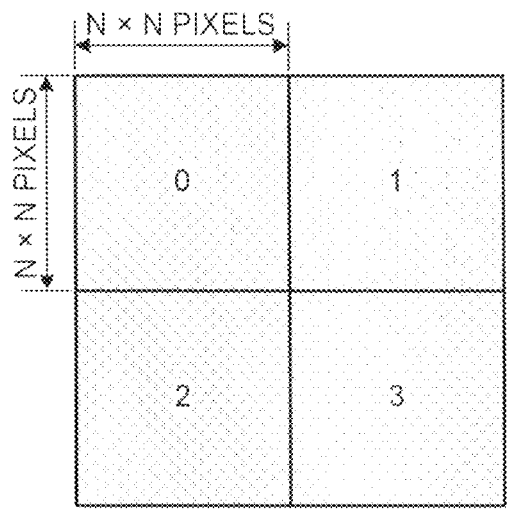
FIG. 3C is a diagram that illustrates a specific example of the coding tree block according to the first embodiment.
Figure 3D:
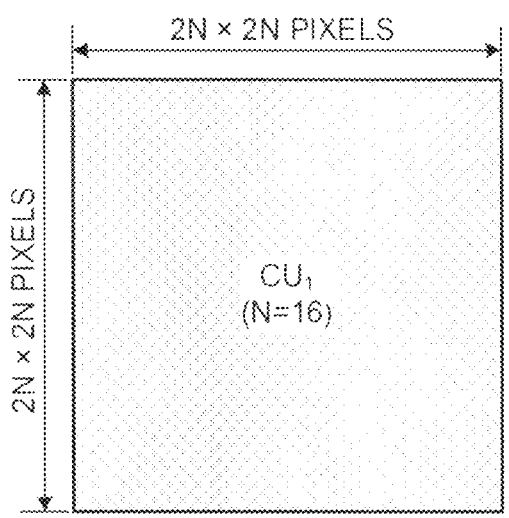
FIG. 3D is a diagram that illustrates a specific example of the coding tree block according to the first embodiment.

FIGS. 3B to 3D are diagrams representing specific examples of the coding tree block according to the first embodiment. FIG. 3B represents a coding tree block having a block size of 64×64 (N=32). Here, N represents the size of a reference coding tree block. The size of a case where the coding tree block is divided is defined as N, and the size of a case where the coding tree block is not divided is defined as 2N. FIG. 3C represents a coding tree block acquired by dividing the coding tree block illustrated in FIG. 3B into a quadtree. The coding tree block, as illustrated in FIG. 3C, has a quadtree structure. In a case where the coding tree block is divided, as illustrated in FIG. 3C, numbers are attached to four pixel blocks after division in the Z scanning order.

In addition, within each number of the quadtree, the coding tree block may be further divided into a quadtree. Accordingly, the coding tree block may be divided in a hierarchical manner. In such a case, the depth of the division is defined as Depth. FIG. 3D represents one of the coding tree blocks acquired by dividing the coding tree block illustrated in FIG. 3B into a quadtree, and the block size thereof is 32×32 (N=16). The depth of the coding tree block illustrated in FIG. 3B is "0", and the depth of the coding tree block illustrated in FIG. 3D is "1". In addition, a coding tree block having a largest unit is called a large coding tree block, and an input image signal is encoded in such a unit in the raster scanning order.

In the description presented below, the encoded target block or the coding tree block of an input image may be referred to as a prediction target block or a prediction pixel block. In addition, the encoding unit is not limited to the pixel block, but at least one of a frame, a field, a slice, a line, and a pixel may be used as the encoding unit.

The encoding device 100, as illustrated in FIG. 1, includes: a subtraction unit 101; an orthogonal transformation unit 102; a quantization unit 103; an inverse quantization unit 104; an inverse orthogonal transformation unit 105; an addition unit 106; a predicted image generating unit 107; an index setting unit 108; a motion evaluating unit 109; and an encoding unit 110. In addition, the encoding control unit 111 illustrated in FIG. 1 controls the encoding device 100 and, for example, may be implemented by using a CPU (Central Processing Unit) or the like.

The subtraction unit 101 acquires a prediction error by subtracting a corresponding predicted image from an input image divided into pixel blocks. The subtraction unit 101 outputs the prediction error so as to be input to the orthogonal transformation unit 102.

The orthogonal transformation unit 102 performs an orthogonal transformation such as a discrete cosine transform (DCT) or a discrete sine transform (DST) for the prediction error input from the subtraction unit 101, thereby acquiring a transformation coefficient. The orthogonal transformation unit 102 outputs the transformation coefficient so as to be input to the quantization unit 103.

The quantization unit 103 performs a quantization process for the transformation coefficient input from the orthogonal transformation unit 102, thereby acquiring a quantization transformation coefficient. More specifically, the quantization unit 103 performs quantization based on a quantization parameter designated by the encoding control unit 111 and quantization information such as a quantization matrix. Described in more detail, the quantization unit 103 acquires the quantization transformation coefficient by dividing the transformation coefficient by a quantization step size derived based on the quantization information. The quantization parameter represents the fineness of the quantization. The quantization matrix is used for weighting the fineness of the quantization for each component of the transformation coefficient. The quantization unit 103 outputs the quantization transformation coefficient so as to be input to the inverse quantization unit 104 and the encoding unit 110.

The inverse quantization unit 104 performs an inverse quantization process for the quantization transformation coefficient input from the quantization unit 103, thereby acquiring a restoration transformation coefficient. More specifically, the inverse quantization unit 104 performs inverse quantization based on the quantization information used by the quantization unit 103. Described in detail, the inverse quantization unit 104 acquires a restoration transformation coefficient by multiplying the quantization transformation coefficient by the quantization step size derived based on the quantization information. In addition, the quantization information used by the quantization unit 103 is loaded from an internal memory, which is not illustrated in the figure, of the encoding control unit 111 and is used. The inverse quantization unit 104 outputs the restoration transformation coefficient so as to be input to the inverse orthogonal transformation unit 105.

The inverse orthogonal transformation unit 105 performs an inverse orthogonal transformation such as an inverse discrete cosine transform (IDCT) or an inverse discrete sine transform (IDST) for the restoration transformation coefficient input from the inverse quantization unit 104, thereby acquiring a restoration prediction error. Here, the inverse orthogonal transformation performed by the inverse orthogonal transformation unit 105 corresponds to an orthogonal transformation performed by the orthogonal transformation unit 102. The inverse orthogonal transformation unit 105 outputs the restoration prediction error so as to be input to the addition unit 106.

The addition unit 106 adds the restoration prediction error input from the inverse orthogonal transformation unit 105 and a corresponding predicted image, thereby generating a local decoded image. The addition unit 106 outputs the local decoded image so as to be input to the predicted image generating unit 107.

The predicted image generating unit 107 stores the local decoded image input from the addition unit 106 in a memory (not illustrated in FIG. 1) as a reference image and outputs the reference image stored in the memory so as to be input to the motion evaluating unit 109. In addition, the predicted image generating unit 107 generates a predicted image by performing a weighted motion compensated prediction based on the motion information and WP parameter information input from the motion evaluating unit 109. The predicted image generating unit 107 outputs the predicted image so as to be input to the subtraction unit 101 and the addition unit 106.

Figure 4:
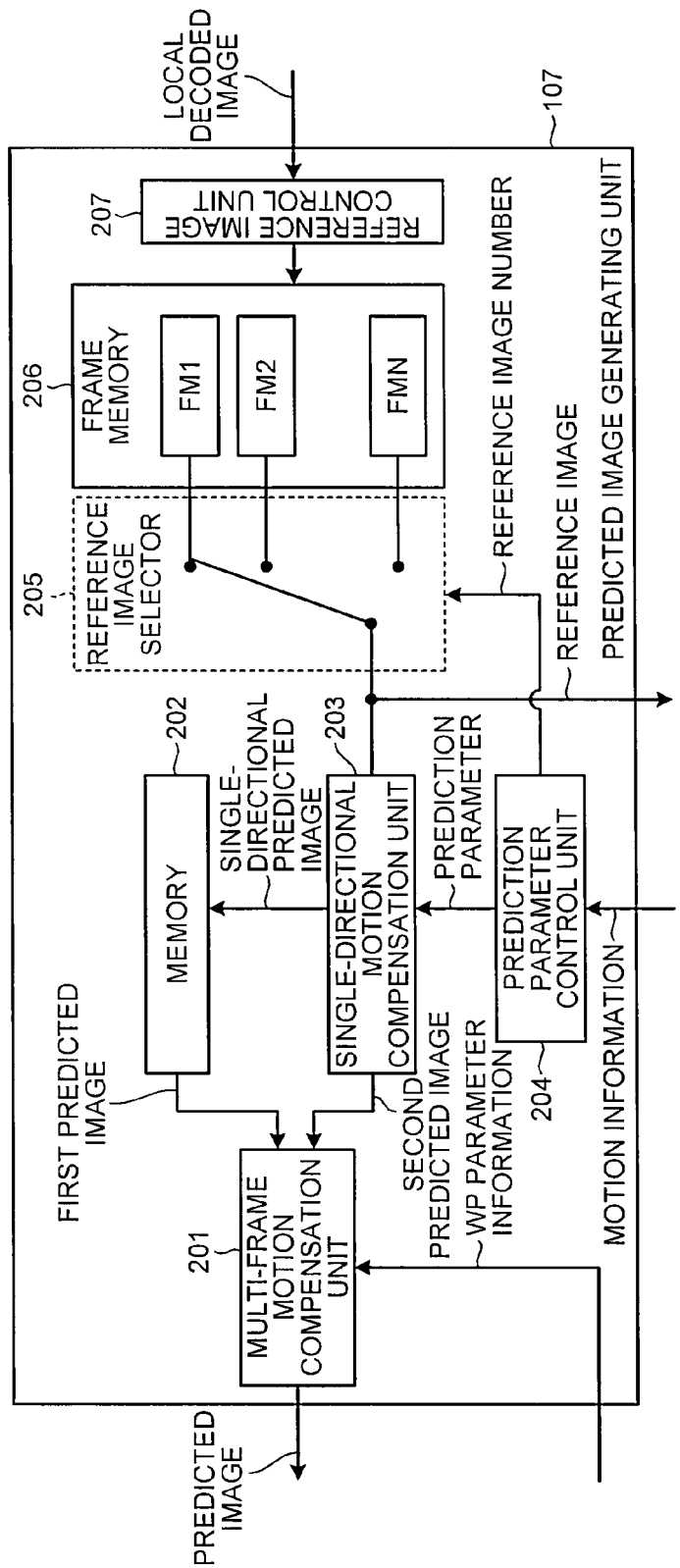
FIG. 4 is a block diagram that illustrates an example of a predicted image generating unit according to the first embodiment.

FIG. 4 is a block diagram that illustrates an example of the configuration of the predicted image generating unit 107 according to the first embodiment. The predicted image generating unit 107, as illustrated in FIG. 4, includes: a multi-frame motion compensation unit 201; a memory 202; a single-directional motion compensation unit 203; a prediction parameter control unit 204; a reference image selector 205; a frame memory 206; and a reference image control unit 207.

The frame memory 206 stores the local decoded image input from the addition unit 106 as a reference image under the control of the reference image control unit 207. The frame memory 206 includes a plurality of memory sets FM1 to FMN (here, N≥2) used for temporarily storing the reference image.

The prediction parameter control unit 204 prepares a plurality of combinations each of a reference image number and a prediction parameter as a table based on the motion information input from the motion evaluating unit 109. Here, the motion information represents information of a motion vector representing the deviation of a motion that is used for the motion compensated prediction, the reference image number, and a prediction mode such as a single-directional/bidirectional prediction. The prediction parameter represents information relating to the motion vector and the prediction mode. Then, the prediction parameter control unit 204 selects a combination of a reference number and a prediction parameter used for generating a predicted image based on the input image and outputs the selected combination so as to allow the reference image number to be input to the reference image selector 205 and allow the prediction parameter to be input to the single-directional motion compensation unit 203.

The reference image selector 205 is a switch that changes one of output terminals of the frame memories FM1 to FMN, which are included in the frame memory 206, to be switched to based on a reference image number input from the prediction parameter control unit 204. For example, when the reference image number is "0", the reference image selector 205 connects the output terminal of the frame memory FM1 to the output terminal of the reference image selector 205, and, when the reference image number is N−1, the reference image selector 205 connects the output terminal of the frame memory FMN to the output terminal of the reference image selector 205. The reference image selector 205 outputs a reference image stored in the frame memory of which the output terminal is connected thereto from among the frame memories FM1 to FMN included in the frame memory 206 so as to be input to the single-directional motion compensation unit 203 and the motion evaluating unit 109.

The single-directional predicted motion compensation unit 203 performs a motion compensated prediction process based on the prediction parameter input from the prediction parameter control unit 204 and the reference image input from the reference image selector 205, thereby generating a single-directional predicted image.

Figure 5:
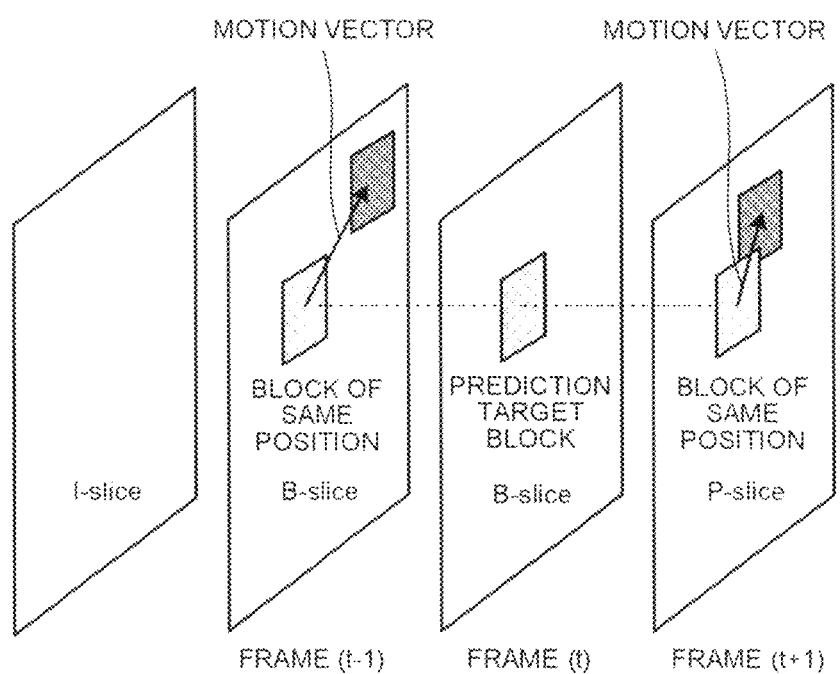
FIG. 5 is a diagram that illustrates an example of the relation between motion vectors for a motion compensated prediction in a bidirectional prediction according to the first embodiment.

FIG. 5 is a diagram that illustrates an example of the relation between motion vectors for a motion compensated prediction in a bidirectional prediction according to the first embodiment. In the motion compensated prediction, an interpolation process is performed using the reference image, and a single-directional predicted image is generated based on deviations of motions of the generated interpolated image and the input image from the pixel block located at the encoding target position. Here, the deviation is a motion vector. As illustrated in FIG. 5, in the bidirectional prediction slice (B-slice), a predicted image is generated by using two types of reference images and a motion vector set. As the interpolation process, an interpolation process of ½-pixel precision, an interpolation process of ¼-pixel precision, or the like is used, and, by performing a filtering process for the reference image, a value of the interpolated image is generated. For example, in H.264 in which an interpolation up to ¼-pixel precision can be performed for a luminance signal, the deviation is represented as four times integer pixel precision.

The single-directional predicted motion compensation unit 203 outputs a single-directional predicted image and temporarily stores the single-directional predicted image in the memory 202. Here, in a case where the motion information (prediction parameter) represents a bidirectional prediction, the multi-frame motion compensation unit 201 makes a weighted prediction using two types of single-directional predicted images. Accordingly, the single-directional predicted motion compensation unit 203 stores a single-directional predicted image corresponding to the first type in the memory 202 and directly outputs a single-directional predicted image corresponding to the second type to the multi-frame motion compensation unit 201. Here, the single-directional predicted image corresponding to the first type will be referred to as a first predicted image, and the single-directional predicted image corresponding to the second type will be referred to as a second predicted image.

In addition, two single-directional motion compensation units 203 may be prepared and generate two single-directional predicted images. In such a case, when the motion information (prediction parameter) represents a single-directional prediction, the single-directional motion compensation unit 203 may directly output the first single-directional predicted image to the multi-frame motion compensation unit 201 as a first predicted image.

The multi-frame motion compensation unit 201 makes a weighted prediction by using the first predicted image input from the memory 202, the second predicted image input from the single-directional predicted motion compensation unit 203, and the WP parameter information input from the motion evaluating unit 109, thereby generating a predicted image. The multi-frame motion compensation unit 201 outputs the predicted image so as to be input to the subtraction unit 101 and the addition unit 106.

Figure 6:
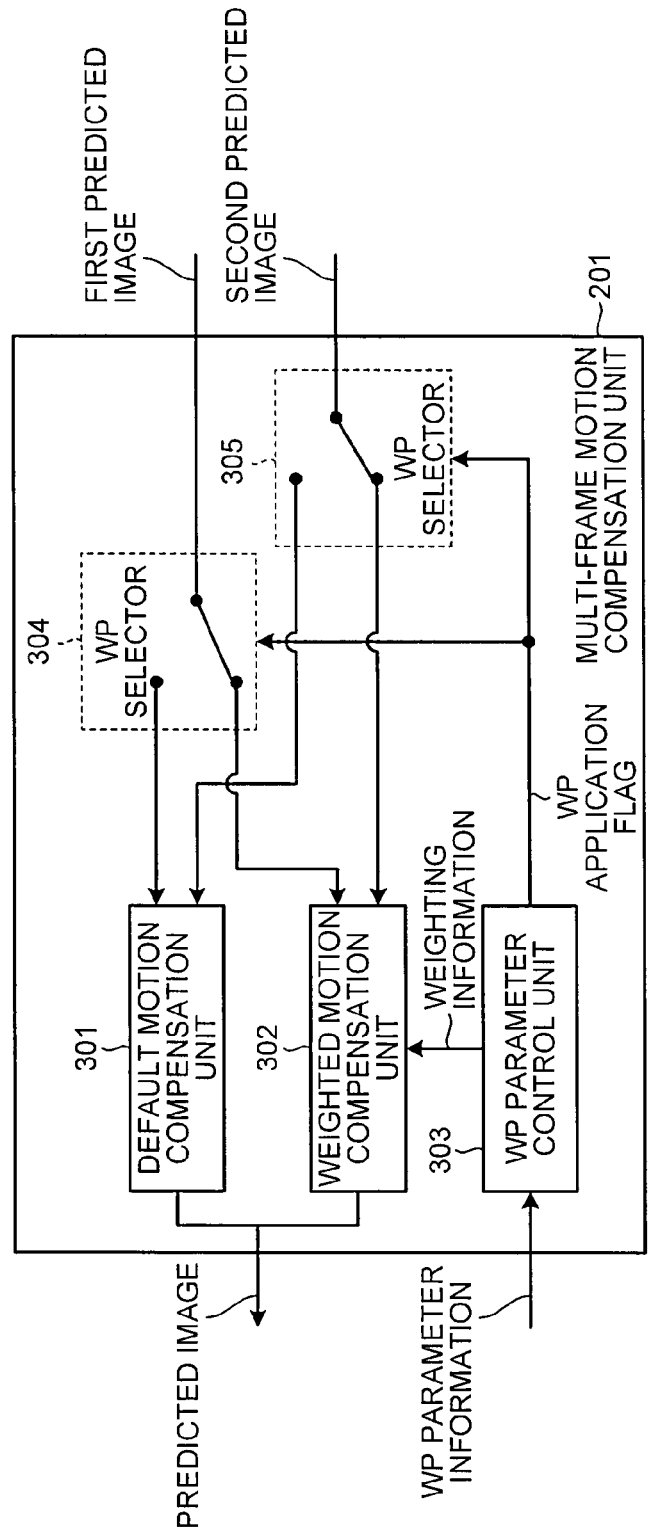
FIG. 6 is a block diagram that illustrates an example of a multi-frame motion compensation unit according to the first embodiment.

FIG. 6 is a block diagram that illustrates an example of the configuration of the multi-frame motion compensation unit 201 according to the first embodiment. As illustrated in FIG. 6, the multi-frame motion compensation unit 201 includes: a default motion compensation unit 301; a weighted motion compensation unit 302; a WP parameter control unit 303; and WP selectors 304 and 305.

The WP parameter control unit 303 outputs a WP application flag and weighting information based on the WP parameter information input from the motion evaluating unit 109 so as to input the WP application flag to the WP selectors 304 and 305 and input the weighting information to the weighted motion compensation unit 302.

Here, the WP parameter information includes information of the fixed point precision of the weighting factor, a first WP application flag, a first weighting factor, and a first offset corresponding to the first predicted image, and a second WP application flag, a second weighting factor, and a second offset corresponding to the second predicted image. The WP application flag is a parameter that can be set for each corresponding reference image and signal component and represents whether or not a weighted motion compensation prediction is made. The weighting information includes information of the fixed point precision of the weighting factor, the first weighting factor, the first offset, the second weighting factor, and the second offset.

Described in detail, when the WP parameter information is input from the motion evaluating unit 109, the WP parameter control unit 303 outputs the WP parameter information with being divided into the first WP application flag, the second WP application flag, and the weighting information, thereby inputting the first WP application flag to the WP selector 304, inputting the second WP application flag to the WP selector 305, and inputting the weighting information to the weighted motion compensation unit 302.

The WP selectors 304 and 305 change the connection ends of the predicted images based on the WP application flags input from the WP parameter control unit 303. In a case where the corresponding WP application flag is "0", each one of the WP selectors 304 and 305 connects the output end thereof to the default motion compensation unit 301. Then, the WP selectors 304 and 305 output the first and second predicted images so as to be input to the default motion compensation unit 301. On the other hand, in a case where the corresponding WP application flag is "1", each one of the WP selectors 304 and 305 connects the output end thereof to the weighted motion compensation unit 302. Then, the WP selectors 304 and 305 output the first and second predicted images so as to be input to the weighted motion compensation unit 302.

The default motion compensation unit 301 performs average processing based on the two single-directional predicted images (the first and second predicted images) input from the WP selectors 304 and 305, thereby generating a predicted image. More specifically, in a case where the first and second WP application flags are "0"s, the default motion compensation unit 301 performs average processing based on Numerical Expression (1).

$$P[x,y]=\text{Clip}1((PL0[x,y]+PL1[x,y]+\text{offset2})>>(\text{shift2})) \quad (1)$$

Here, P[x, y] is a predicted image, PL0[x, y] is a first predicted image, and PL1[x, y] is a second predicted image. In addition, offset2 and shift2 are parameters of a rounding process in the average processing and are determined based on the internal calculation precision of the first and second predicted images. When the bit precision of the predicted image is L, and the bit precision of the first and second predicted images is M (L≤M), shift2 is formulated by Numerical Expression (2), and offset2 is formulated by Numerical Expression (3).

$$\text{shift2}=(M-L+1) \quad (2)$$

$$\text{offset2}=(1<<(\text{shift2}-1)) \quad (3)$$

For example, the bit precision of the predicted image is "8", and the bit precision of the first and second predicted images is "14", shift2=7 based on Numerical Expression (2), and offset2=(1<<6) based on Numerical Expression (3).

In addition, in a case where the prediction mode represented by the motion information (prediction parameter) is the single-directional prediction, the default motion compensation unit 301 calculates a final predicted image using only the first predicted image based on Numerical Expression (4).

$$P[x,y] = \text{Clip1}((PLX[x,y] + \text{offset1}) >> (\text{shift1})) \quad (4)$$

Here, PLX[x, y] represents a single-directional predicted image (first predicted image), and X is an identifier representing either "0" or "1" as a reference list. For example, PLX[x, y] is PL0[x, y] in a case where the reference list is "0" and is PL1[x, y] in a case where the reference list is "1". In addition, offset1 and shift1 are parameters for a rounding process and are determined based on the internal calculation precision of the first predicted image. When the bit precision of the predicted image is L, and the bit precision of the first predicted image is M, shift1 is formulated by Numerical Expression (5), and offset1 is formulated by Numerical Expression (6).

$$\text{shift1} = (M-L) \quad (5)$$

$$\text{offset1} = (1 << (\text{shift1}-1)) \quad (6)$$

For example, in a case where the bit precision of the predicted image is "8", and the bit precision of the first predicted image is "14", shift1=6 based on Numerical Expression (5), and offset1=(1<<5) based on Numerical Expression (6).

The weighted motion compensation unit 302 performs weighted motion compensation based on the two single-directional predicted images (the first and second predicted images) input from the WP selectors 304 and 305 and the weighting information input from the WP parameter control unit 303. More specifically, the weighted motion compensation unit 302 performs the weighting process based on Numerical Expression (7) in a case where the first and second WP application flags are "1"s.

$$P[x,y] = \text{Clip1}(((PL0[x,y]*w_{0C} + PL1[x,y]*w_{1C} + (1<<\log WD_C))>>(\log WD_C+1)) + ((o_{0C}+o_{1C}+1)>>1)) \quad (7)$$

Here, $w_{0C}$ represents a weighting factor corresponding to the first predicted image, $w_{1C}$ represents a weighting factor corresponding to the second predicted image, $o_{0C}$ represents an offset corresponding to the first predicted image, and $o_{1C}$ represents an offset corresponding to the second predicted image. Thereafter, they will be referred to as a first weighting factor, a second weighting factor, a first offset, and a second offset respectively. $\log WD_C$ is a parameter representing fixed point precision of each weighting factor. In addition, a variable C represents a signal component. For example, in the case of a YUV spatial signal, a luminance signal is represented by C=Y, a Cr color difference signal is represented by C=Cr, and a Cb color difference component is represented by C=Cb.

In addition, in a case where the calculation precision of the first and second predicted images and the calculation precision of the predicted image are different from each other, the weighted motion compensation unit 302 realizes a rounding process by controlling $\log WD_C$, which is fixed point precision, as in Numerical Expression (8).

$$\log WD'_C = \log WD_C + \text{offset1} \quad (8)$$

The rounding process can be realized by replacing log $WD_C$ represented in Numerical Expression (7) with log $WD'_C$ represented in Numerical Expression (8). For example, in a case where the bit precision of the predicted image is "8", and the bit precision of the first and second predicted images is "14", by resetting log $WD_C$, it is possible to realize a batch rounding process for the calculation precision similar to that of shift2 represented in Numerical Expression (1).

In addition, in a case where the prediction mode represented by the motion information (prediction parameter) is a single directional prediction, the weighted motion compensation unit 302 calculates a final predicted image using only the first predicted image based on Numerical Expression (9).

$$P[x,y] = \text{Clip1}((PLX[x,y]*w_{XC} + (1<<\log WD_C-1))>> (\log WD_C)) \quad (9)$$

Here, PLX[x, y] represents a single-directional predicted image (first predicted image), $w_{XC}$ represents a weighting factor corresponding to the single directional prediction, and X is an identifier representing either "0" or "1" as a reference list. For example, PLX[x, y] and $w_{XC}$ are PL0[x, y] and $w_{0C}$ in a case where the reference list is "0" and are PL1[x, y] and $w_{1C}$ in a case where the reference list is "1".

In addition, in a case where the calculation precision of the first and second predicted images and the calculation precision of the predicted image are different from each other, the weighted motion compensation unit 302 realizes a rounding process by controlling log $WD_C$, which is fixed point precision, as in Numerical Expression (8), similarly to the case of the bidirectional prediction.

The rounding process can be realized by replacing log $WD_C$ represented in Numerical Expression (7) with log $WD'_C$ represented in Numerical Expression (8). For example, in a case where the bit precision of the predicted image is "8", and the bit precision of the first predicted images is "14", by resetting log $WD_C$, it is possible to realize a batch rounding process for the calculation precision similar to that of shift1 represented in Numerical Expression (4).

Figure 7:
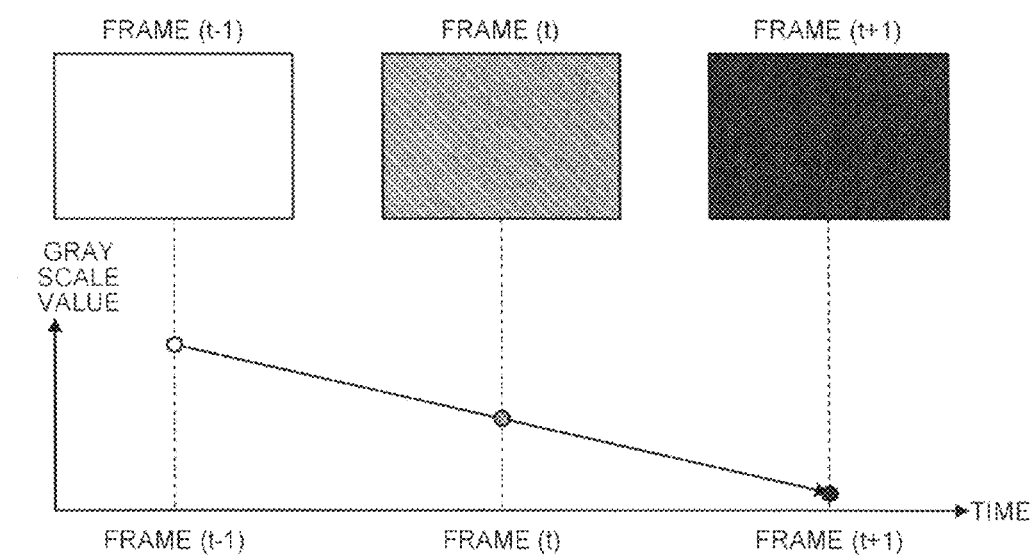
FIG. 7 is an explanatory diagram that illustrates an example of fixed point precision of a weighting factor according to the first embodiment.

FIG. 7 is an explanatory diagram that illustrates an example of fixed point precision of a weighting factor according to the first embodiment and is a diagram that illustrates an example of changes in a moving image having a brightness change in the time direction and a gray scale value. In the example illustrated in FIG. 7, an encoding target frame is Frame(t), a frame that is one frame before the encoding target frame in time is Frame(t−1), and a frame that is one frame after the encoding target frame in time is Frame(t+1). As illustrated in FIG. 7, in a fading image changing from white to black, the brightness (gray scale value) of the image decreases in accordance with elapse of time. The weighting factor represents the degree of change in FIG. 7, and, as is apparent from Numerical Expressions (7) and (9), takes a value of "1.0" in a case where there is no change in the brightness. The fixed point precision is a parameter controlling an interval width corresponding to a decimal point of the weighting factor, and the weighting factor is 1<<log $WD_C$ in a case where there is no change in brightness.

In addition, in the case of a single directional prediction, various parameters (the second WP application flag, the second weighting factor, and the second offset information) corresponding to the second predicted image are not used and may be set to initial values determined in advance.

Referring back to FIG. 1, the motion evaluating unit 109 performs a motion evaluation between a plurality of frames based on an input image and a reference image input from the predicted image generating unit 107 and outputs the motion information and the WP parameter information, thereby inputting the motion information to the predicted image generating unit 107 and the encoding unit 110 and inputting the WP parameter information to the predicted image generating unit 107 and the index setting unit 108.

The motion evaluating unit 109 calculates an error, for example, by calculating differences between an input image of a prediction target pixel block and a plurality of reference images corresponding to the same position as a starting point, shifts the position with fractional precision, and calculates optimal motion information using a technique such as block matching for finding a block of a minimal error or the like. In the case of a bidirectional prediction, the motion evaluating unit 109 performs block matching including a default motion compensation prediction as represented in Numerical Expressions (1) and (4) using the motion information derived from the single-directional prediction, thereby calculating motion information of the bidirectional prediction.

At this time, the motion evaluating unit 109 can calculate the WP parameter information by performing block matching including a weighted motion compensation prediction as represented in Numerical Expressions (7) and (9). In addition, for the calculation of the WP parameter information, a method of calculating a weighting factor or an offset using a brightness gradient of the input image, a method of calculating a weighting factor or an offset in accordance with the accumulation of a prediction error at the time of encoding, or the like may be used. Furthermore, as the WP parameter information, a fixed value determined in advance for each encoding device may be used.

Here, a method of calculating a weighting factor, the fixed point precision of the weighting factor, and an offset from a moving image having a brightness change in time will be described with reference to FIG. 7. As described above, in the fading image changing from white to black as illustrated in FIG. 7, the brightness (gray scale value) of the image decreases in accordance with the elapse of time. The motion evaluating unit 109 can calculate the weighting factor by calculating the slope thereof.

The fixed point precision of the weighting factor is information representing the precision of the slope, and the motion evaluating unit 109 can calculate an optimal value based on a distance to the reference image in time and the degree of change of the image brightness. For example, in FIG. 7, in a case where the weighting factor between Frame(t−1) and Frame(t+1) is 0.75 with fractional precision, ¾ can be represented in the case of ¼ precision, and accordingly, the motion evaluating unit 109 sets the fixed point precision to 2 (1<<2). Since the value of the fixed point precision influences on the code amount of a case where the weighting factor is encoded, as the value of the fixed point precision, an optimal value may be selected in consideration of the code amount and the prediction precision. In addition, the value of the fixed point precision may be a fixed value determined in advance.

In addition, in a case where the slope is not matched, the motion evaluating unit 109 can calculate the value of the offset by acquiring a correction value (deviation amount) corresponding to the intercept of the linear function. For example, in FIG. 7, in a case where a weighting factor between Frame(t−1) and Frame(t+1) is 0.60 with decimal point precision, and the fixed point precision is "1" (1<<1), there is a high possibility that the weighting factor is set to "1" (corresponding to decimal point precision of 0.50 of the weighting factor). In such a case, since the decimal point precision of the weighting factor deviates from 0.60, which is an optimal value, by 0.10, the motion evaluating unit 109 calculates a correction value corresponding thereto based on a maximum value of the pixel and is set as the value of the offset. In a case where the maximum value of the pixel is 255, the motion evaluating unit 109 may set a value such as 25 (255×0.1).

In the first embodiment, although the motion evaluating unit 109 is represented as one function of the encoding device 100 as an example, the motion evaluating unit 109 is not an essential configuration of the encoding device 100, and, for example, the motion evaluating unit 109 may be a device other than the encoding device 100. In such a case, the motion information and the WP parameter information calculated by the motion evaluating unit 109 may be loaded into the encoding device 100.

The index setting unit 108 receives the WP parameter information input from the motion evaluating unit 109, checks a reference list (list number) and a reference image (reference number), and outputs index information so as to be input to the encoding unit 110. The index setting unit 108 generates the index information by mapping the WP parameter information input from the motion evaluating unit 109 into a syntax element to be described later.

FIGS. 8A and 8B are diagrams illustrating examples of the WP parameter information according to the first embodiment. An example of the WP parameter information at the time of P-slice is as illustrated in FIG. 8A, and an example of the WP parameter information at the time of B-slice is as illustrated in FIGS. 8A and 8B. A list number is an identifier representing a prediction direction. The list number has a value of "0" in the case of a single-directional prediction. On the other hand, in the case of a bidirectional prediction, two types of prediction can be used, and accordingly, the list number has two values of "0" and "1". A reference number is a value corresponding to any one of 1 to N represented in the frame memory 206. Since the WP parameter information is maintained for each reference list and reference image, in a case where there are N reference images, 2N pieces of information are necessary at the time of B-slice.

Referring back to FIG. 1, the encoding unit 110 performs an encoding process of various encoding parameters such as the quantization transformation coefficient input from the quantization unit 103, the motion information input from the motion evaluating unit 109, the index information input from the index setting unit 108, and the quantization information designated by the encoding control unit 111, thereby generating encoded data. As the encoding process, for example, there is a Huffman encoding or arithmetic coding.

Here, the encoding parameters are parameters such as prediction information representing a prediction method or the like, information relating to the quantization transformation coefficient, and information relating to quantization that are necessary for a decoding process. For example, it may be configured such that an internal memory not illustrated in the figure is included in the encoding control unit 111, the encoding parameters are maintained in the internal memory, and the encoding parameters of an adjacent pixel block, which has been completed to be encoded, is used when a pixel block is encoded. For example, in an intra-prediction of H.264, prediction information of a pixel block may be derived from the prediction information of an adjacent block that has been completed to be encoded.

The encoding unit 110 outputs the generated encoded data at appropriate output timing managed by the encoding control unit 111. Various kinds of information, which is output encoded data, for example, is multiplexed by a multiplexing unit not illustrated in the figure or the like, is temporarily stored in an output buffer not illustrated in the figure or the like, and, then, for example, is output to a storage system (storage medium) or a transmission system (communication line).

The encoding unit 110 includes an entropy encoding unit 110A and an index reconfiguring unit 110B.

The entropy encoding unit 110A performs an encoding process such as variable-length coding or arithmetic coding process for information that has been input. For example, in H.264, a context based adaptive variable length coding (CAVLC), context based adaptive binary arithmetic coding (CABAC), or the like is used.

In order to reduce the code length of a syntax element of the index information input from the index setting unit 108, the index reconfiguring unit 110B performs a prediction process based on the characteristics of the parameters of the syntax element, calculates a difference between the value (direct value) of the syntax element and a predicted value, and outputs the difference to the entropy encoding unit 110A. A specific example of the prediction process will be described later.

Figure 9:
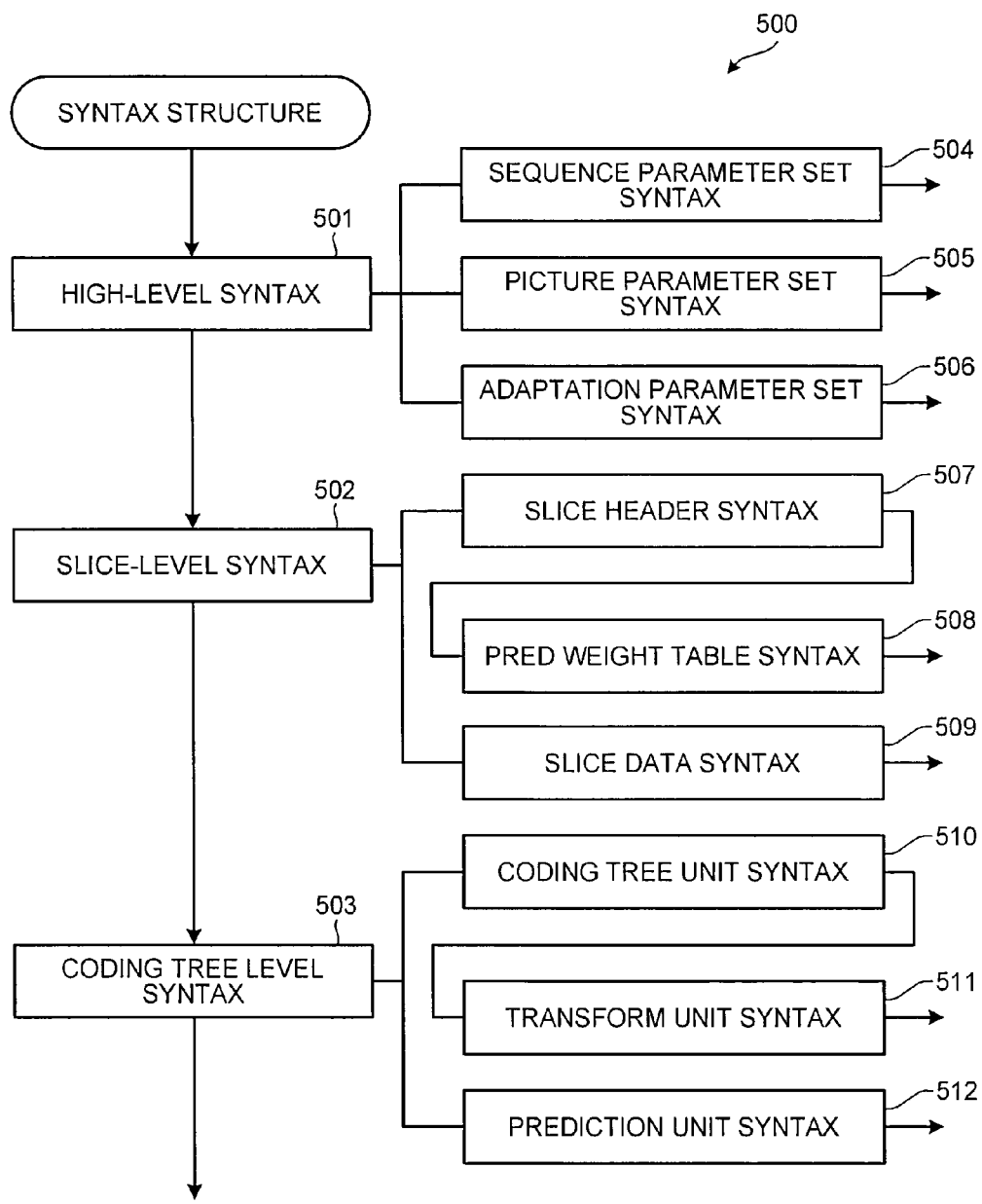
FIG. 9 is a diagram that illustrates an example of syntax according to the first embodiment.

FIG. 9 is a diagram that illustrates an example of syntax 500 used by the encoding device 100 according to the first embodiment. The syntax 500 illustrates the structure of encoded data generated by encoding an input image (moving image data) using the encoding device 100. When the encoded data is decoded, a decoding device to be described later performs a syntax analysis of a moving image by referring to a syntax structure that is the same as that of the syntax 500.

The syntax 500 includes three parts including a high-level syntax 501, a slice-level syntax 502, and a coding tree level syntax 503. The high-level syntax 501 includes syntax information of an upper layer that has a level higher than the slice. Here, the slice represents a rectangular area or a continuous area included in a frame or a field. The slice-level syntax 502 includes information that is necessary for decoding each slice. The coding tree level syntax 503 includes information that is necessary for decoding each coding tree (in other words, each coding tree block). Each of these parts includes more detailed syntax.

The high-level syntax 501 includes syntaxes of a sequence and a picture level such as a sequence parameter set syntax 504, a picture parameter set syntax 505, and an adaptation parameter set syntax 506.

The slice-level syntax 502 includes a slice header syntax 507, a flat weight table syntax 508, a slice data syntax 509, and the like. The flat weight table syntax 508 is called from the slice header syntax 507.

The coding tree level syntax 503 includes a coding tree unit syntax 510, a transform unit syntax 511, a prediction unit syntax 512, and the like. The coding tree unit syntax 510 may have a quadtree structure. More specifically, the coding tree unit syntax 510 may be recursively further called as a syntax element of the coding tree unit syntax 510. In other words, one coding tree block may be subdivided into quadtrees. In addition, the transform unit syntax 511 is included in the coding tree unit syntax 510. The transform unit syntax 511 is called from each coding tree unit syntax 510 located at a tail end of the quadtree. In the transform unit syntax 511, information relating to inverse orthogonal transformation, quantization, and the like is described. In the syntaxes, information relating to the weighted motion compensation prediction may be described.

FIG. 10 is a diagram that illustrates an example of the picture parameter set syntax 505 according to the first embodiment. Here, weighted_pred_flag, for example, is a syntax element representing the validness or invalidness of a weighted compensation prediction according to the first embodiment for a P-slice. In a case where the weighted_pred_flag is "0", the weighted motion compensation prediction according to the first embodiment within the P-slice is invalid. Accordingly, the WP application flag included in the WP parameter information is constantly set to "0", and the output ends of the WP selectors 304 and 305 are connected to the default motion compensation unit 301. On the other hand, in a case where the weighted_pred_flag is "1", the weighted motion compensation prediction according to the first embodiment within the P-slice is valid.

As another example, in a case where the weighted_pred_flag is "1", the validness or invalidness of the weighted motion compensation prediction according to the first embodiment may be defined for each local area within the slice in the syntax of a lower layer (the slice header, the coding tree block, the transform unit, the prediction unit, and the like).

In addition, weighted_bipred_idc, for example, is a syntax element representing the validness or invalidness of a weighted compensation prediction according to the first embodiment for a B-slice. In a case where the weighted_bipred_idc is "0", the weighted motion compensation prediction according to the first embodiment within the B-slice is invalid. Accordingly, the WP application flag included in the WP parameter information is constantly set to "0", and the output ends of the WP selectors 304 and 305 are connected to the default motion compensation unit 301. On the other hand, in a case where the weighted_bipred_idc is "1", the weighted motion compensation prediction according to the first embodiment within the B-slice is valid.

As another example, in a case where the weighted_bipred_idc is "1", the validness or invalidness of the weighted motion compensation prediction according to the first embodiment may be defined for each local area within the slice in the syntax of a lower layer (the slice header, the coding tree block, the transform unit, and the like).

FIG. 11 is a diagram that illustrates an example of the slice header syntax 507 according to the first embodiment. Here, slice-type represents the slice type (an I-slice, a P-slice, a B-slice, or the like) of slice. In addition, pic_parameter_set_id is an identifier representing a picture parameter set syntax 505 to be referred to. num_ref_idx_active_override_flag is a flag representing whether to update the number of valid reference images, and, in a case where this flag is "1", num_ref_idx_l0_active_minus1 and num_ref_idx_l1_active_minus1 that define the number of reference images of the reference list may be used. In addition, pred_weight_table( ) is a function representing the pred weight table syntax used for a weighted motion compensation prediction, and this function is called in a case where the weighted_pred_flag is "1" in the case of a P-slice and a case where weighted_bipred_idc is "1" in the case of a B-slice.

FIG. 12 is a diagram that illustrates an example of the pred weight table syntax 508 according to the first embodiment. Here, luma_log 2_weight_denom represents the fixed point precision of the weighting factor of the luminance signal in a slice and is a value corresponding to log $WD_C$ represented in Numerical Expression (7) or (9). In addition, chroma_log 2_weight_denom represents the fixed point precision of the weighting factor of a color difference signal in a slice and is a value corresponding to log $WD_C$ represented in Numerical Expression (7) or (9). chroma_format_idc is an identifier representing a color space, and MONO_IDX is a value representing a monochrome video. In addition, num_ref_common_active_minus1 represents a value that is acquired by subtracting one from the number of reference images included in a common list in a slice.

luma_weight_l0_flag and luma_weight_l1_flag represent WP application flags of luminance signals corresponding to Lists 0 and 1. In a case where this flag is "1", a weighted motion compensation prediction of the luminance signal according to the first embodiment is valid for all the areas within the slice. In addition, chroma_weight_l0_flag and chroma_weight_l1_flag represent WP application flags of color difference signals corresponding to Lists 0 and 1. In a case where this flag is "1", a weighted motion compensation prediction of a color difference signal according to the first embodiment is valid for all the area within the slice. luma_weight_l0[i] and luma_weight_l1[i] are weighting factors of the i-th luminance signals managed by Lists 0 and 1. In addition, luma_offset_l0[i] and luma_offset_l1[i] are offsets of the i-th luminance signals managed by Lists 0 and 1. These are values corresponding to $w_{0C}$, $w_{1C}$, $o_{0C}$, $o_{1C}$ represented in Numerical Expression (7) or (9). Here, C=Y.

chroma_weight_l0[i][j] and chroma_weight_l1[i][j] are weighting factors of the i-th color difference signals managed by Lists 0 and 1. In addition, chroma_offset_l0[i][j] and chroma_offset_l1[i][j] are offsets of the i-th color difference signals managed by Lists 0 and 1. These are values corresponding to $w_{0C}$, $w_{1C}$, $o_{0C}$, $o_{1C}$ represented in Numerical Expression (7) or (9). Here, C=Cr or Cb. In addition, j represents a component of the color difference, and, for example, in the case of a signal of YUV 4:2:0, j=0 represents a Cr component, and j=1 represents a Cb component.

Here, a method of predicting each syntax element relating to the weighted prediction in the syntax configuration will be described in detail. The prediction of the syntax element is performed by the index reconfiguring unit 110B. FIG. 13 is a diagram that illustrates an example of the syntax configuration explicitly representing a prediction method according to the first embodiment. In the example illustrated in FIG. 13, while each syntax element of which the prediction has been introduced is denoted by attaching a prefix "delta", the syntax configuration basically has the same constituent elements as the syntax configuration illustrated in FIG. 12.

First, an inter-signal prediction method of luma_log 2_weight_denom and chroma_log 2_weight_denom representing the fixed point precision of the weighting factor will be described. The index reconfiguring unit 110B performs the inter-signal prediction process of luma_log 2_weight_denom and chroma_log 2_weight_denom using Numerical Expression (10) and performs a restoration process using Numerical Expression (11). Here, as illustrated in FIGS. 12 and 13, since luma_log 2_weight_denom is defined first, chroma_log 2_weight_denom is predicted based on the value of luma_log 2_weight_denom.

$$\text{delta\_chroma\_log 2\_weight\_denom}=(\text{chroma\_log 2\_weight\_denom}-\text{luma\_log 2\_weight\_denom}) \quad (10)$$

$$\text{chroma\_log 2\_weight\_denom}=(\text{luma\_log 2\_weight\_denom}+\text{delta\_chroma\_log 2\_weight\_denom}) \quad (11)$$

Figure 14:
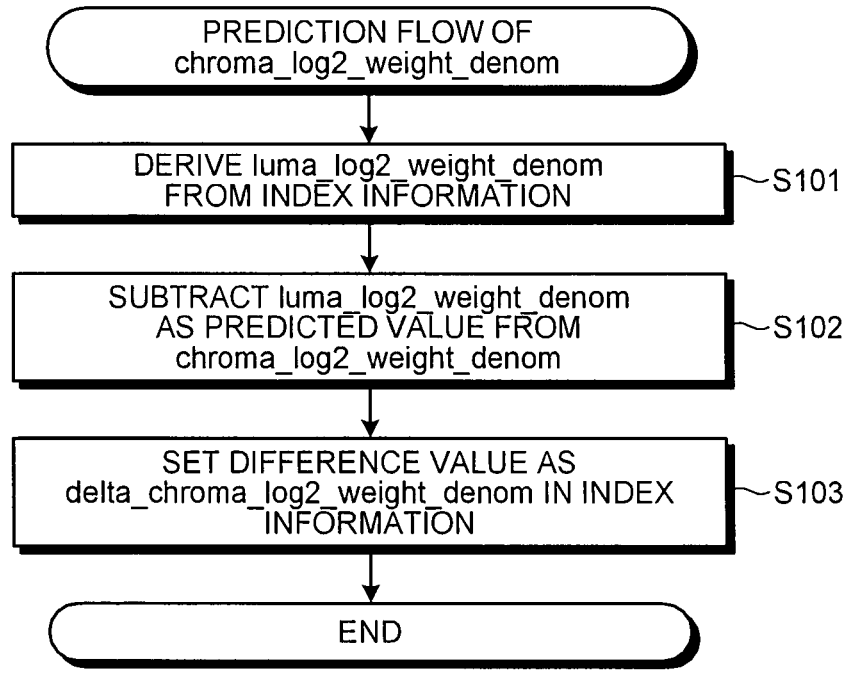
FIG. 14 is a flowchart that illustrates an example of the process of predicting fixed point precision according to the first embodiment.

FIG. 14 is a flowchart that illustrates an example of the process of predicting chroma_log 2_weight_denom according to the first embodiment.

First, the index reconfiguring unit 110B derives luma_log 2_weight_denom set in the index information as a predicted value (Step S101).

Subsequently, the index reconfiguring unit 110B subtracts luma_log 2_weight_denom from chroma_log 2_weight_denom (Step S102) and sets a difference value thereof as delta_chroma_log 2_weight_denom in the index information (Step S103).

Figure 15:
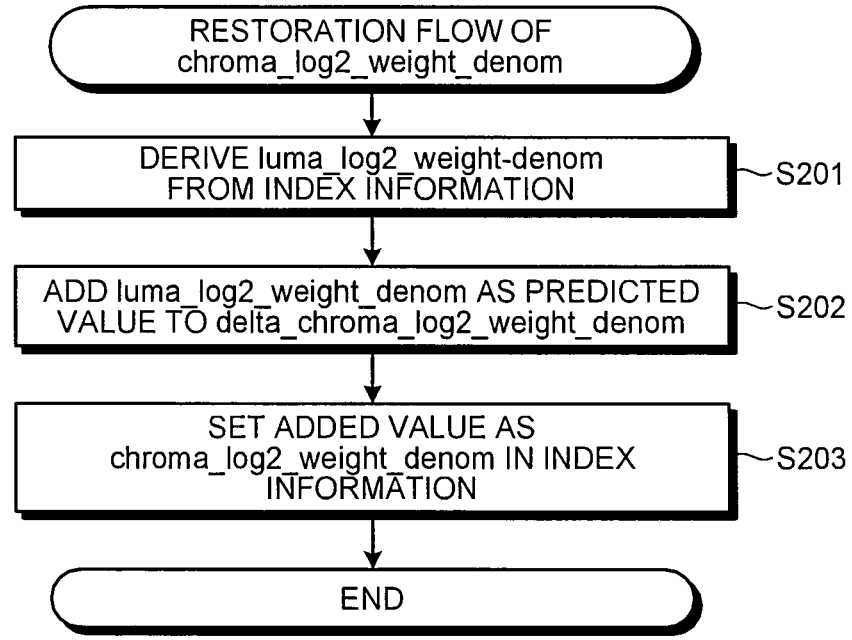
FIG. 15 is a flowchart that illustrates an example of the process of restoring fixed point precision according to the first embodiment.

FIG. 15 is a flowchart that illustrates an example of the process of restoring chroma_log 2_weight_denom according to the first embodiment.

First, the index reconfiguring unit 110B derives luma_log 2 weight_denom that has already been set in the index information as a predicted value (Step S201).

Subsequently, the index reconfiguring unit 110B adds luma_log 2_weight_denom to delta_chroma_log 2_weight_denom (Step S202) and sets an added value in the index information as chroma_log 2 weight_denom (Step S203).

In a fading effect, generally, since there are a small number of cases in which changes in time are made differently for each color space, the fixed point precision for each signal component has strong correlation with a luminance component and a color difference component. Accordingly, by making a prediction inside the color space as described above, the amount of information representing the fixed point precision can be reduced.

In Numerical Expression (10), although the luminance component is subtracted from the color difference component, the color difference component may be subtracted from the luminance component. In such a case, Numerical Expression (11) may be changed in accordance with Numerical Expression (10).

Next, a method of predicting luma_weight_lx[i] and chroma_weight_lx[i][j] representing weighting factors of the luminance and the color difference signal will be described. Here, x is an identifier representing "0" or "1". The values of luma_weight_lx[i] and chroma_weight_lx[i][j] increase or decrease in accordance with the values of luma_log 2_weight_denom and chroma_log 2_weight_denom. For example, in a case where the value of luma_log 2_weight_denom is "3", luma_weight_lx[i] is (1<<3) in a case where no change in brightness is assumed. On the other hand, in a case where the value of luma_log 2_weight_denom is "5", luma_weight_lx[i] is (1<<5) in a case where no change in brightness is assumed.

Accordingly, the index reconfiguring unit 110B performs a prediction process with a weighting factor of a case where there is no change in brightness being used as a reference coefficient (default value). More specifically, the index reconfiguring unit 110B performs a prediction process of luma_weight_lx[i] using Numerical Expressions (12) and (13) and performs a restoration process using Numerical Expression (14). Similarly, the index reconfiguring unit 110B performs a prediction process of chroma_weight_lx[i] using Numerical Expressions (15) and (16) and performs a restoration process using Numerical Expression (17).

$$\text{delta\_luma\_weight\_}lx[i]=(\text{luma\_weight\_}lx[i]-\text{default\_luma\_weight\_}lx) \quad (12)$$

$$\text{default\_luma\_weight\_}lx=(1<<\text{luma\_log 2\_weight\_denom}) \quad (13)$$

$$\text{luma\_weight\_}lx[i]=(\text{default\_luma\_weight\_}lx+\text{delta\_luma\_weight\_}lx[i]) \quad (14)$$

$$\text{delta\_chroma\_weight\_}lx[i][j]=(\text{chroma\_weight\_}lx[i][j]-\text{default\_chroma\_weight\_}lx) \quad (15)$$

$$\text{default\_chroma\_weight\_}lx=(1<<\text{chroma\_log 2\_weight\_denom}) \quad (16)$$

$$\text{chroma\_weight\_}lx[i][j]=(\text{default\_chroma\_weight\_}lx+\text{delta\_chroma\_weight\_}lx[i][j]) \quad (17)$$

Here, default_luma_weight_lx, default_chroma_weight_lx are default values of a case where there is no brightness change in the luminance component and the color difference component.

FIG. 16 is a flowchart that illustrates an example of the processes of predicting luma_weight_lx[i] according to the first embodiment.

First, the index reconfiguring unit 110B derives luma_log 2_weight_denom set in the index information (Step S301) and calculates default_luma_weight_lx as a predicted value (Step S302).

Subsequently, the index reconfiguring unit 110B subtracts default_luma_weight_lx from luma_weight_lx[i] (Step S303) and sets a difference value thereof in the index information as delta_luma_weight_lx[i] (Step S304).

By repeating this process in correspondence with the number of reference images, the prediction process can be applied to luma_weight_lx[i].

FIG. 17 is a flowchart that illustrates an example of the process of restoring luma_weight_lx[i] according to the first embodiment.

First, the index reconfiguring unit 110B derives delta_luma_weight_lx[i] that has already been set in the index information (Step S401) and calculates default_luma_weight_lx as a predicted value (Step S402).

Subsequently, the index reconfiguring unit 110B adds delta_luma_weight_lx[i] to default_luma_weight_lx (Step S403) and sets an added value thereof in the index information as luma_weight_lx[i] (Step S404).

While the flowchart for the luminance component has been illustrated here, a prediction process and a restoration process can be similarly realized for the color difference component (chroma_weight_lx[i] [j]).

An image including a fading effect fades at a specific fading change point, and there are many cases where the other images are ordinary natural images or images having no fading effect. In such a case, there are many cases where the weighting factor takes a case where there is no change in brightness. Accordingly, an initial value of a case where there is no change in brightness is derived based on the fixed point precision and is used as a predicted value, whereby the code amount of the weighting factor can be reduced.

In addition, the predicted values of the weighting factors (luma_weight_lx[i] and chroma_weight_lx[i][j]) of the luminance and the color difference signal may be derived based on other reference numbers or other POC numbers. In such a case, when a reference number closest to the encoding target slice is base_idx, the index reconfiguring unit 110B performs a prediction process of luma_weight_lx[i] using Numerical Expression (18) and performs a restoration process thereof using Numerical Expression (19). Similarly, the index reconfiguring unit 110B performs a prediction process of chroma_weight_lx[i] [j] using Numerical Expression (20) and performs a restoration process thereof using Numerical Expression (21).

$$\text{delta\_luma\_weight\_}lx[i]=(\text{luma\_weight\_}lx[i]-\text{luma\_weight\_}lx[\text{base\_}idx]) \quad (18)$$

$$\text{luma\_weight\_}lx[i]=(\text{delta\_luma\_weight\_}lx[i]+\text{luma\_weight\_}lx[\text{base\_}idx]) \quad (19)$$

$$\text{delta\_chroma\_weight\_}lx[i][j]=(\text{chroma\_weight\_}lx[i][j]-\text{chroma\_weight\_}lx[\text{base\_}idx][j]) \quad (20)$$

$$\text{chroma\_weight\_}lx[i][j]=(\text{delta\_chroma\_weight\_}lx[i][j]+\text{chroma\_weight\_}lx[\text{base\_}idx][j]) \quad (21)$$

Here, in Numerical Expressions (18) and (20), i≠base_idx. For the weighting factor of the reference number represented by base_idx, Numerical Expressions (18) and (20) cannot be used, and accordingly, Numerical Expressions (12), (13), (15), and (16) may be used.

Figure 18:
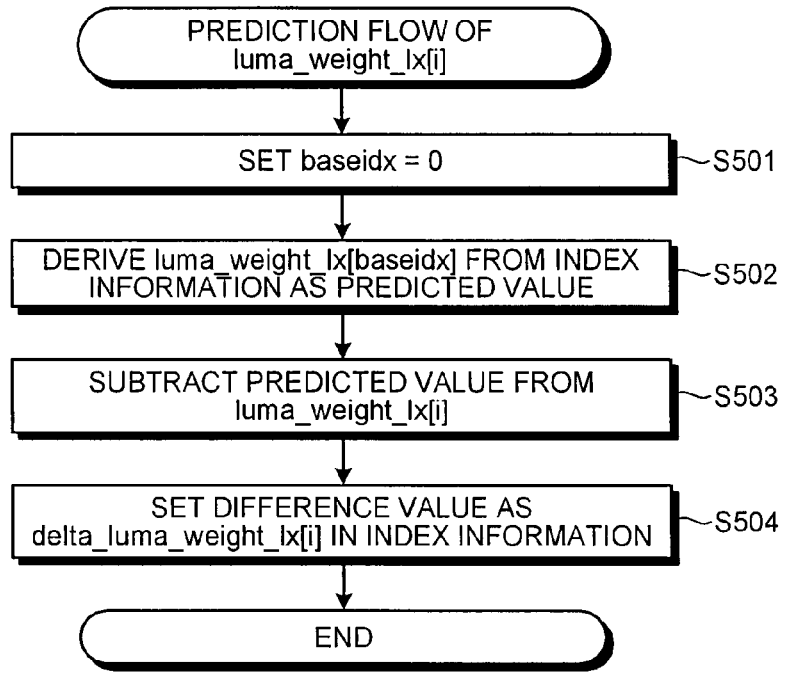
FIG. 18 is a flowchart that illustrates another example of a weighting factor predicting process according to the first embodiment.

FIG. 18 is a flowchart that illustrates another example of the prediction process of luma_weight_lx[i] according to the first embodiment.

First, the index reconfiguring unit 110B sets baseidx representing a reference number that is a reference (Step S501). Here, the value of baseidx is provisionally assumed to be "0".

Subsequently, the index reconfiguring unit 110B derives luma_weight_lx[baseidx] from the index information as a predicted value based on baseidx (Step S502). In addition, luma_weight_lx[baseidx] of the index information represented by baseidx, for example, is not predicted but is encoded as a direct value.

Subsequently, the index reconfiguring unit 110B subtracts luma_weight_lx[baseidx] from luma_weight_lx[i] (Step S503) and sets a difference value thereof as delta_luma_weight_lx[i] in the index information (Step S504).

By repeating this process in correspondence with the number of reference images, the prediction process can be applied to luma_weight_lx[i] other than baseidx.

Figure 19:
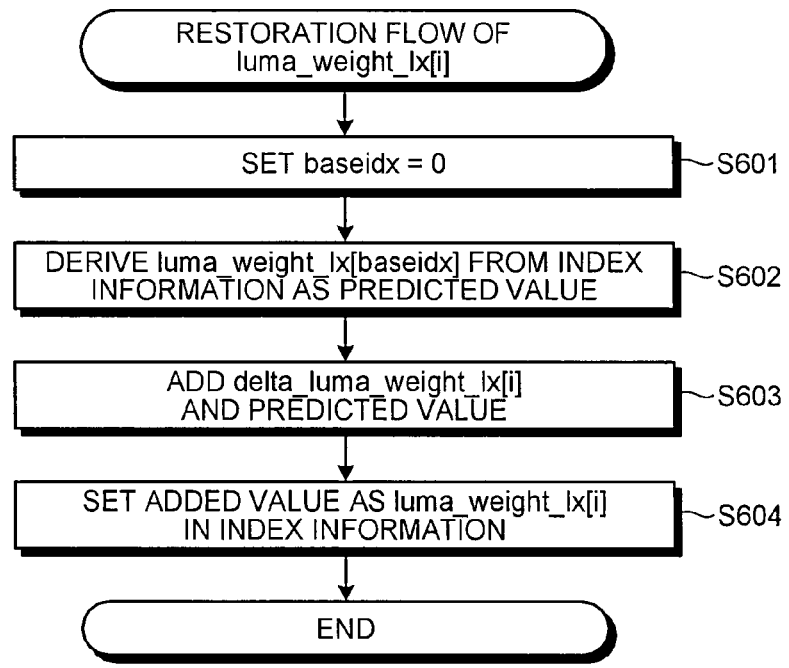
FIG. 19 is a flowchart that illustrates another example of a weighting factor restoring process according to the first embodiment.

FIG. 19 is a flowchart that illustrates another example of the process of restoring luma_weight_lx[i] according to the first embodiment.

First, the index reconfiguring unit 110B sets baseidx representing a reference number that is a reference (Step S601). Here, the value of baseidx is provisionally assumed to be "0".

Subsequently, the index reconfiguring unit 110B derives luma_weight_lx[baseidx] from the index information as a predicted value based on baseidx (Step S602). In addition, luma_weight_lx[baseidx] of the index information represented by baseidx, for example, is not predicted but is encoded as a direct value.

Subsequently, the index reconfiguring unit 110B adds delta_luma_weight_lx[i] to luma_weight_lx[baseidx] (Step S603) and sets an added value thereof as luma_weight_lx[i] in the index information (Step S604).

While the flowchart for the luminance component has been illustrated here, a prediction process and a restoration process can be similarly realized for the color difference component (chroma_weight_lx[i] [j]). In addition, while the prediction method and the restoration method of luma_weight_lx[i] have been described as an example, luma_offset_lx[i] can be similarly predicted and restored.

In addition, the predicted values of the weighting factors ((luma_weight_lx[i] and chroma_weight_lx[i] [j]) of the luminance and the color difference signal may be derived using a distance between the encoding target and the reference slice. In such a case, the index reconfiguring unit 110B performs a prediction process of luma_weight_lx[i] using Numerical Expression (22) and performs a restoration process thereof using Numerical Expression (23). Similarly, the index reconfiguring unit 110B performs a prediction process of chroma_weight_lx[i] [j] using Numerical Expression (24) and performs a restoration process thereof using Numerical Expression (25).

$$\text{delta\_luma\_weight\_}lx[i]=(\text{luma\_weight\_}lx[i]-\text{luma\_weight\_}lx[i-1]) \quad (22)$$

$$\text{luma\_weight\_}lx[i]=(\text{delta\_luma\_weight\_}lx[i]+\text{luma\_weight\_}lx[i-1]) \quad (23)$$

$$\text{delta\_chroma\_weight\_}lx[i][j]=(\text{chroma\_weight\_}lx[i][j]-\text{chroma\_weight\_}lx[i-1][j]) \quad (24)$$

$$\text{chroma\_weight\_}lx[i][j]=(\text{delta\_chroma\_weight\_}lx[i][j]+\text{chroma\_weight\_}lx[i-1][j]) \quad (25)$$

Here, in Numerical Expressions (22) and (24), i≠0.

In addition, since these prediction and restoration processes are the same as those of the flowchart illustrated in FIGS. 18 and 19 by introducing the (i−1)-the value (i≠0) in baseidx, description thereof will not be presented. While the flowchart for the luminance component has been represented here, the prediction process and the restoration process can be similarly realized for the color difference component (chroma_weight_lx[i] [j]). Furthermore, while the prediction method and the restoration method of luma_weight_lx [i] have been described as an example, luma_offset_lx[i] also can be similarly predicted and restored.

There are many cases where, as a reference slice that can be referred to by the encoding target slice, a slice that is close to the encoding target slice in terms of a distance in time or space is set from the viewpoint of the encoding efficiency. Here, since luminance changes of slices that are continuous in distance in time have a high correlation, the correlations relating to a distance in time between the weighting factors and the offsets are also high. Thus, by using the weighting factor and the offset value of the reference slice serving as a reference, a weighting factor and an offset value of a reference slice that is different therefrom in time are predicted, whereby the code amount can be efficiently reduced. In addition, since there are many cases where reference slices that are the same in space take weighting factors and offset values that are the same, by introducing a prediction for the same reason, the code amount can be reduced.

Next, a prediction method of chroma_offset_lx[i] [j] representing an offset of the color difference signal will be described. In the color space of YUV, a color difference component represents a color using the amount of a deviation from a median value. Accordingly, the amount of change based on a change in brightness with the median value considered can be set as a predicted value using a weighting factor. More specifically, the index reconfiguring unit 110B performs a prediction process of chroma_offset_lx[i] [j] using Numerical Expressions (26) and (27) and performs a restoration process using Numerical Expression (28).

$$\text{delta\_chroma\_offset\_}lx[i][j]=(\text{chroma\_offset\_}lx[i][j]+((MED*\text{chroma\_weight\_}lx[i][j])>>\text{chroma\_log2\_weight\_denom})-MED) \quad (26)$$

$$MED=(\text{MaxChromaValue}>>1) \quad (27)$$

Here, MaxChromaValue represents maximal brightness at which a color different signal is obtained. For example, in the case of an 8-bit signal, MaxChromaValue is 255, and MED is 128.

$$\text{chroma\_offset\_}lx[i][j]=(\text{delta\_chroma\_offset\_}lx[i][j]-((MED*\text{chroma\_weight\_}lx[i][j])>>\text{chroma\_log2\_weight\_denom})+MED) \quad (28)$$

Figure 20:
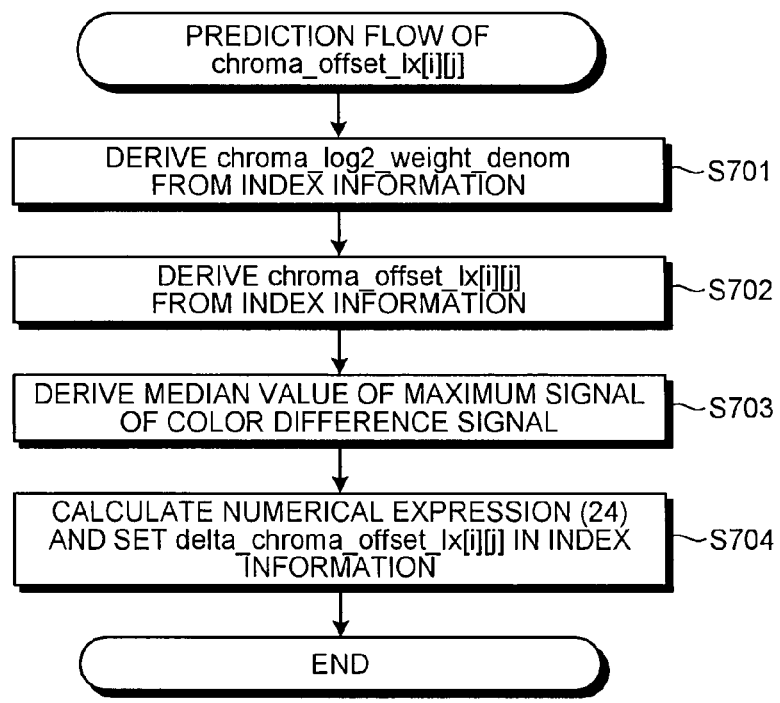
FIG. 20 is a flowchart that illustrates an example of a prediction process of a color difference signal according to the first embodiment.

FIG. 20 is a flowchart that illustrates an example of the prediction process of chroma_offset_lx[i] [j] according to the first embodiment.

First, the index reconfiguring unit 110B derives chroma_log 2_weight_denom set in the index information (Step S701).

Subsequently, the index reconfiguring unit 110B derives chroma_offset_lx[i] [j] set in the index information (Step S702).

Subsequently, the index reconfiguring unit 110B derives a median value of maximal values (maximum signals) of color difference signals (Step S703).

Subsequently, the index reconfiguring unit 110B derives delta_chroma_offset_lx[i] [j] and sets delta_chroma_offset_lx[i] [j] in the index information (Step S704).

Figure 21:
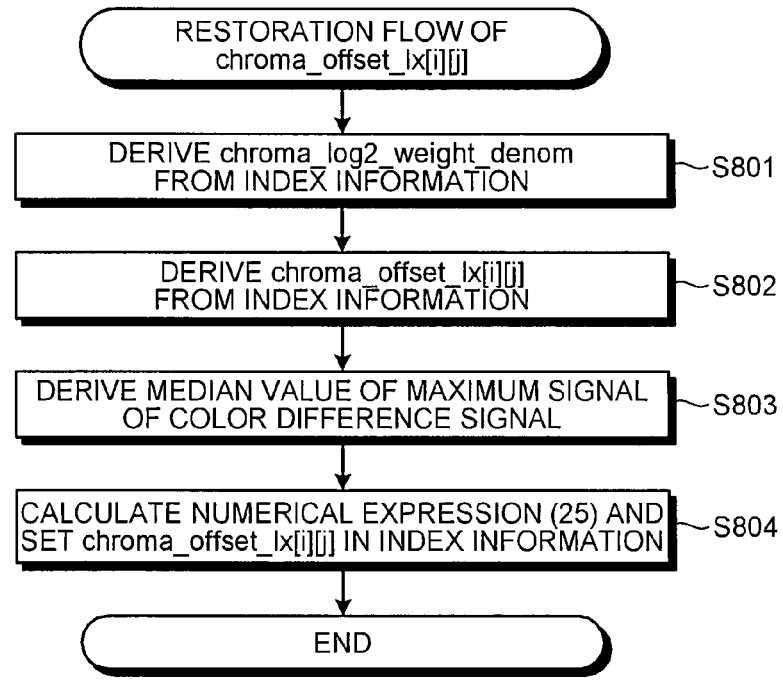
FIG. 21 is a flowchart that illustrates an example of a restoration process of a color difference signal according to the first embodiment.

FIG. 21 is a flowchart that illustrates an example of a restoration process of chroma_offset_lx[i] [j] according to the first embodiment.

First, the index reconfiguring unit 110B derives chroma_log 2_weight_denom that has already been set in the index information (Step S801).

Subsequently, the index reconfiguring unit 110B derives chroma_offset_lx[i] [j] set in the index information (Step S802).

Subsequently, the index reconfiguring unit 110B derives a median value of maximal values (maximum signals) of color difference signals (Step S803).

Subsequently, the index reconfiguring unit 110B derives chroma_offset_lx[i] [j] and sets chroma_offset_lx[i] [j] in the index information (Step S804).

By introducing a predicted value acquired by considering the amount of a deviation from the median value using the signal characteristics of the color difference signal, the code amount of the offset value of the color difference signal can be smaller than that of a case where the offset value is directly encoded.

Next, a technique of deriving predicted values of the weighting factor and the fixed point precision using method of deriving WP parameters of an implicit weighted prediction in a weighted prediction defined in H.264 or the like will be described. In the implicit weighted prediction of H.264, a weighting factor is derived in accordance with a distance (a time ratio of the POC number) in time between reference slices (the offset becomes zero). The distance in time between the reference slices is acquired by deriving distances between an encoding target slice and the reference slices based on the POC numbers, and the weighting factor is determined based on the ratio of the distances. At this time, the fixed point precision is set to a fixed value of "5".

For example, in H.264, the weighting factor is derived in accordance with a pseudo code represented in Numerical Expression (29).

$$td=\text{Clip3}(-128,127,POCA-POCB)$$

$$tb=\text{Clip3}(-128,127,POCT-POCA)$$

$$tx=(td!=0)?((16384+abs(td/2))/td):(0)$$

$$\text{DistScaleFactor}=\text{Clip3}(-1024,1023,(tb*tx+32)>>6)$$

$$\text{implicit\_luma\_weight\_}l0[i]=64-(\text{DistScaleFactor}>>2)$$

$$\text{implicit\_luma\_weight\_}l1[i]=\text{DistScaleFactor}>>2 \quad (29)$$

Here, POCA represents a POC number of a reference image A corresponding to List 1, POCB represents a POC number of a reference image B corresponding to List 0, and POCT represents a POC number of a prediction target image. In addition, Clip3(L, M, N) is a function for performing a clipping process such that a last argument N does not exceed a range of a minimal value L and a maximal value M represented by the first two arguments. An abs( ) function is a function for returning an absolute value of an argument. In addition, td and tb represent time ratios, td represents a difference between a POC number of a reference image corresponding to List 1 and a POC number of a reference image corresponding to List 0, and tb represents a difference between a POC number of the prediction target image and a POC number of the reference image corresponding to List 0. Based on such values, a scaling variable DistScaleFactor in the distance of the weighting factor is derived. Based on DistScaleFactor, weighting factors (implicit_luma_weight_l0[i] and implicit_luma_weight_l1[i]) corresponding to Lists 0 and 1 are derived. In addition, the color difference signal is similarly set. The index reconfiguring unit 110B predicts the fixed point precision based on Numerical Expression (30) by using the fixed point precision implicit_log 2_weight_denom derived here.

delta_luma_log 2_weight_denom=(luma_log 2_weight_denom−implicit_log 2_weight_denom)    (30)

In addition, the fixed point precision of the color difference signal can be predicted using Numerical Expression (30). This value is restored by using Numerical Expression (31).

luma_log 2_weight_denom=(delta_luma_log 2_weight_denom+implicit_log 2_weight_denom)    (31)

In addition, the fixed point precision of the color difference signal can be restored using the same method represented in Numerical Expression (31).

Next, an equation for predicting the weighting factor will be described. When an implicit weighting factor is implicit_luma_weight_lx[i], the index reconfiguring unit 110B predicts a weighting factor luma_weight_lx[i] using Numerical Expression (32) and restores the weighting factor using Numerical Expression (33).

```
                                                                         (32)
if (luma_log2_weight_denom > = implicit_log2_weight_denom) {
norm_denom = (luma_log2_weight_denom −
implicit_log2_weight_denom)
delta_luma_weight_lx[i] = (luma_weight_lx[i] −
(implicit_luma_weight_lx[i] << norm_denom))
}
else{
norm_denom = (implicit_log2_weight_denom −
luma_log2_weight_denom)
delta_luma_weight_lx[i] = (luma_weight_lx[i] −
(implicit_luma_weight_lx[i] >> norm_denom))
}
```

Here, the index reconfiguring unit 110B corrects the weighting factor based on whether the implicit weighted prediction is larger or smaller than the fixed point precision and uses the corrected weighting factor for the prediction.

```
                                                                         (33)
if (luma_log2_weight_denom > = implicit_log2_weight_denom) {
norm_denom = (luma_log2_weight_denom −
implicit_log2_weight_denom)
luma_weight_lx[i] = (delta_luma_weight_lx[i] +
(implicit_luma_weight_lx[i] << norm_denom))
}
else{
norm_denom = (implicit_log2_weight_denom −
luma_log2_weight_denom)
luma_weight_lx[i] = (delta_luma_weight_lx[i] +
(implicit_luma_weight_lx[i] >> norm_denom))
}
```

In Numerical Expression (32), while an example of the weighting factor of the luminance component is represented, by using the same method for the color difference component, a predicted value can be derived.

Figure 22:
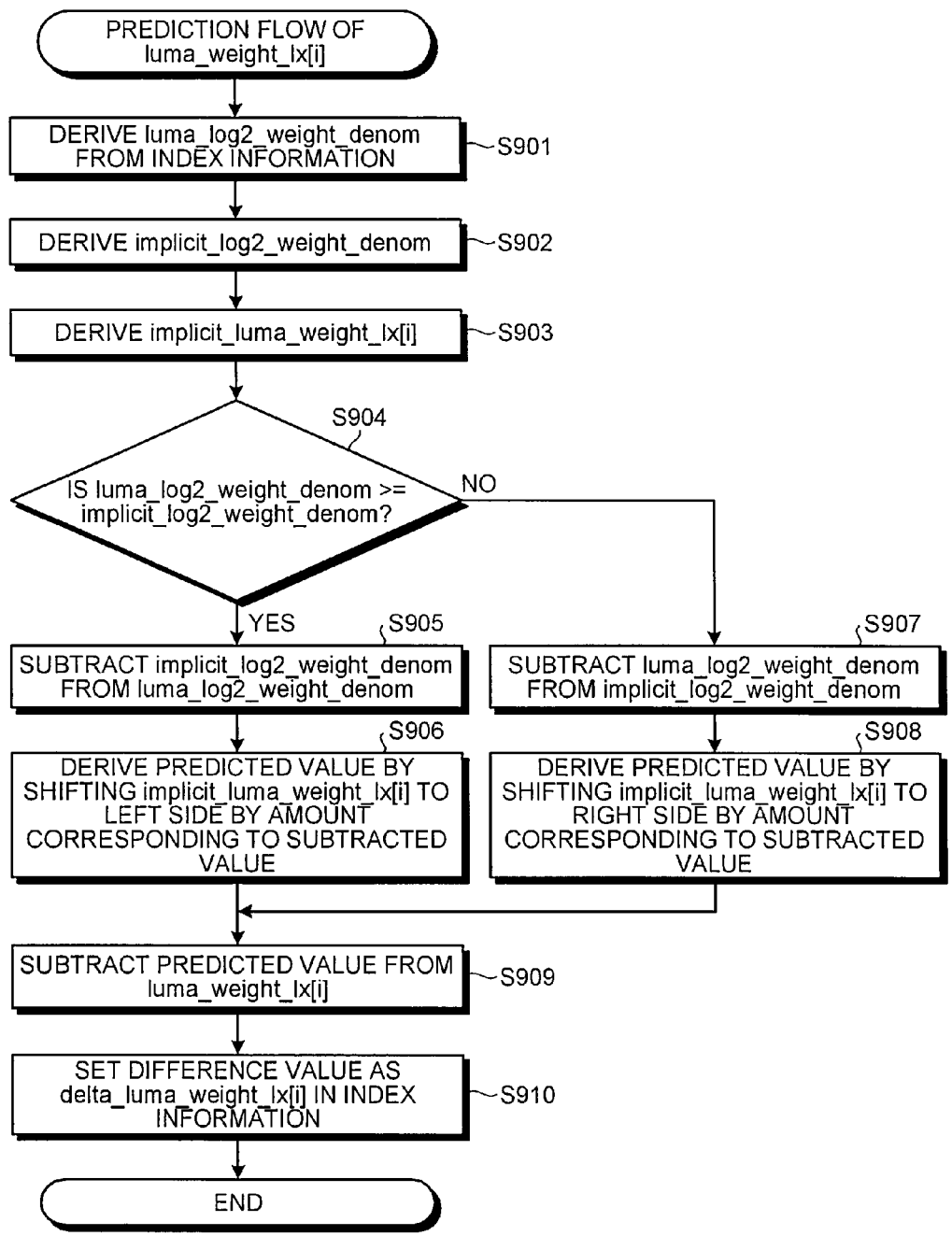
FIG. 22 is a flowchart that illustrates another example of a prediction process of a weighting factor according to the first embodiment.

FIG. 22 is a flowchart that illustrates another example of a prediction process of luma_weight_lx[i] according to the first embodiment.

First, the index reconfiguring unit 110B derives luma_log 2_weight_denom set in the index information (Step S901).

Subsequently, the index reconfiguring unit 110B derives implicit_log 2_weight_denom and implicit_luma_weight_lx[i] in accordance with the method of deriving an implicit weighted prediction of H.264 (Steps S902 and S903).

Subsequently, the index reconfiguring unit 110B determines whether luma_log 2_weight_denom is implicit_log 2_weight_denom or more (Step S904).

In a case where luma_log 2_weight_denom is implicit_log 2_weight_denom or more (Yes in Step S904), the index reconfiguring unit 110B subtracts implicit_log 2_weight_denom from luma_log 2_weight_denom (Step S905) and shifts implicit_luma_weight_lx[i] to the left side by an amount corresponding to the subtracted value, thereby deriving a predicted value (Step S906).

On the other hand, in a case where luma_log 2_weight_denom is not implicit_log 2_weight_denom or more (No in Step S904), the index reconfiguring unit 110B subtracts luma_log 2_weight_denom from implicit_log 2_weight_denom (Step S907) and shifts implicit_luma_weight_lx[i] to the right side by an amount corresponding to the subtracted value, thereby deriving a predicted value (Step S908).

Subsequently, the index reconfiguring unit 110B subtracts the derived predicted value from luma_weight_lx[i] (Step S909) and sets the subtracted value (difference value) in the index information (Step S910).

Figure 23:
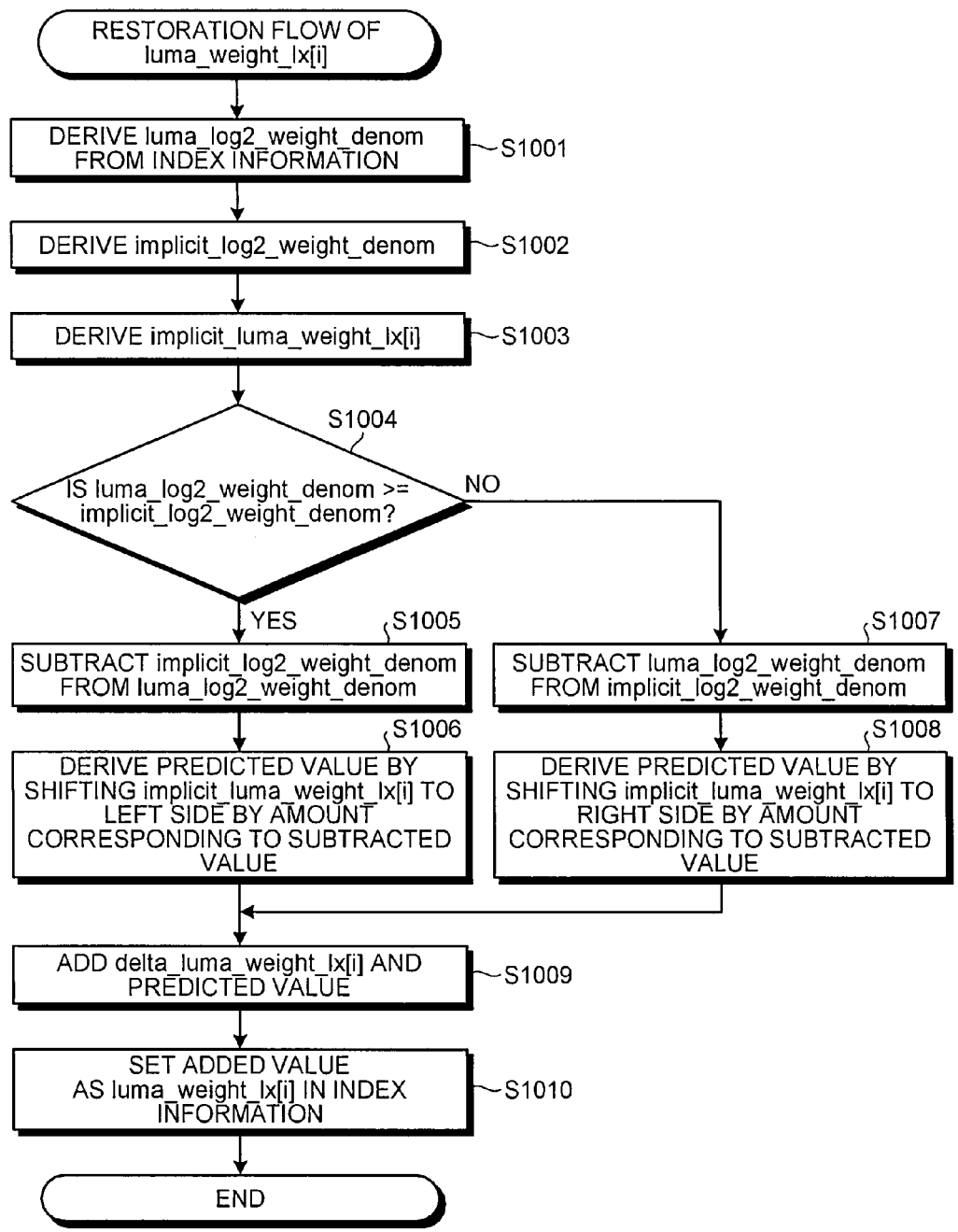
FIG. 23 is a flowchart that illustrates another example of the restoration process of a weighting factor according to the first embodiment.

FIG. 23 is a flowchart that illustrates another example of the restoration process of luma_weight_lx[i] according to the first embodiment.

First, the index reconfiguring unit 110B derives luma_log 2_weight_denom that has already been set in the index information (Step S1001).

Subsequently, the index reconfiguring unit 110B derives implicit_log 2_weight_denom and implicit_luma_weight_lx[i] in accordance with the method of deriving an implicit weighted prediction of H.264 (Steps S1002 and S1003).

Subsequently, the index reconfiguring unit 110B determines whether luma_log 2_weight_denom is implicit_log 2_weight_denom or more (Step S1004).

In a case where luma_log 2_weight_denom is implicit_log 2_weight_denom or more (Yes in Step S1004), the index reconfiguring unit 110B subtracts implicit_log 2_weight_denom from luma_log 2_weight_denom (Step S1005) and shifts implicit_luma_weight_lx[i] to the left side by an amount corresponding to the subtracted value, thereby deriving a predicted value (Step S1006).

On the other hand, in a case where luma_log 2_weight_denom is not implicit_log 2_weight_denom or more (No in Step S1004), the index reconfiguring unit 110B subtracts luma_log 2_weight_denom from implicit_log 2_weight_denom (Step S1007) and shifts implicit_luma_weight_lx[i] to the right side by an amount corresponding to the subtracted value, thereby deriving a predicted value (Step S1008).

Subsequently, the index reconfiguring unit 110B adds the derived predicted value to delta_luma_weight_lx[i] (Step S1009) and sets the added value thereof in the index information (Step S1010).

A plurality of the prediction methods described above may not only be used independently but also be used in a combined manner. For example, by combining Numerical Expressions (10), (12) and (13), (15) and (16), and (26) and (27) or the like, the code amount of the syntax element of the index information can be efficiently reduced.

As above, according to the first embodiment, the index setting unit 108 outputs index information in which the WP parameter information is mapped into a corresponding syntax configuration, and the index reconfiguring unit 110B predicts a redundant representation of the syntax element based on the information encoded within the slice. Therefore, according to the first embodiment, the code amount can be smaller than that of a case where the syntax element is directly (direct value) encoded.

Here, based on the order of definition (order of encoding) of the syntax elements used in the encoding target slice, by deriving a predicted value as an inter-screen correlation from a syntax element that has been completed to be encoded or deriving a predicted value from a default value acquired by assuming no change in brightness, a prediction taking advantage of the characteristics of the syntax elements can be made. As a result, an advantage of reducing the overhead that is necessary for encoding the syntax element is acquired.

In addition, between rows of the syntax table illustrated in FIGS. 10 to 13 according to the first embodiment as examples, a syntax element not defined in this embodiment may be inserted, or a description relating to the other conditional branch may be included. Furthermore, the syntax table may be divided into a plurality of tables, or a plurality of the syntax tables may be integrated. In addition, the term of each syntax element represented as an example may be arbitrarily changed.

As described above, the encoding device 100 according to the first embodiment solves a problem of decreasing the encoding efficiency by eliminating the spatial redundancy using correlations between parameters of information to be encoded. The encoding device 100 can reduce the code amount compared to that of a conventional configuration in which syntax elements used in the weighted motion compensated prediction are directly (direct values) encoded.

Second Embodiment

In a second embodiment, a decoding device decoding encoded data encoded by the encoding device according to the first embodiment will be described.

Figure 24:
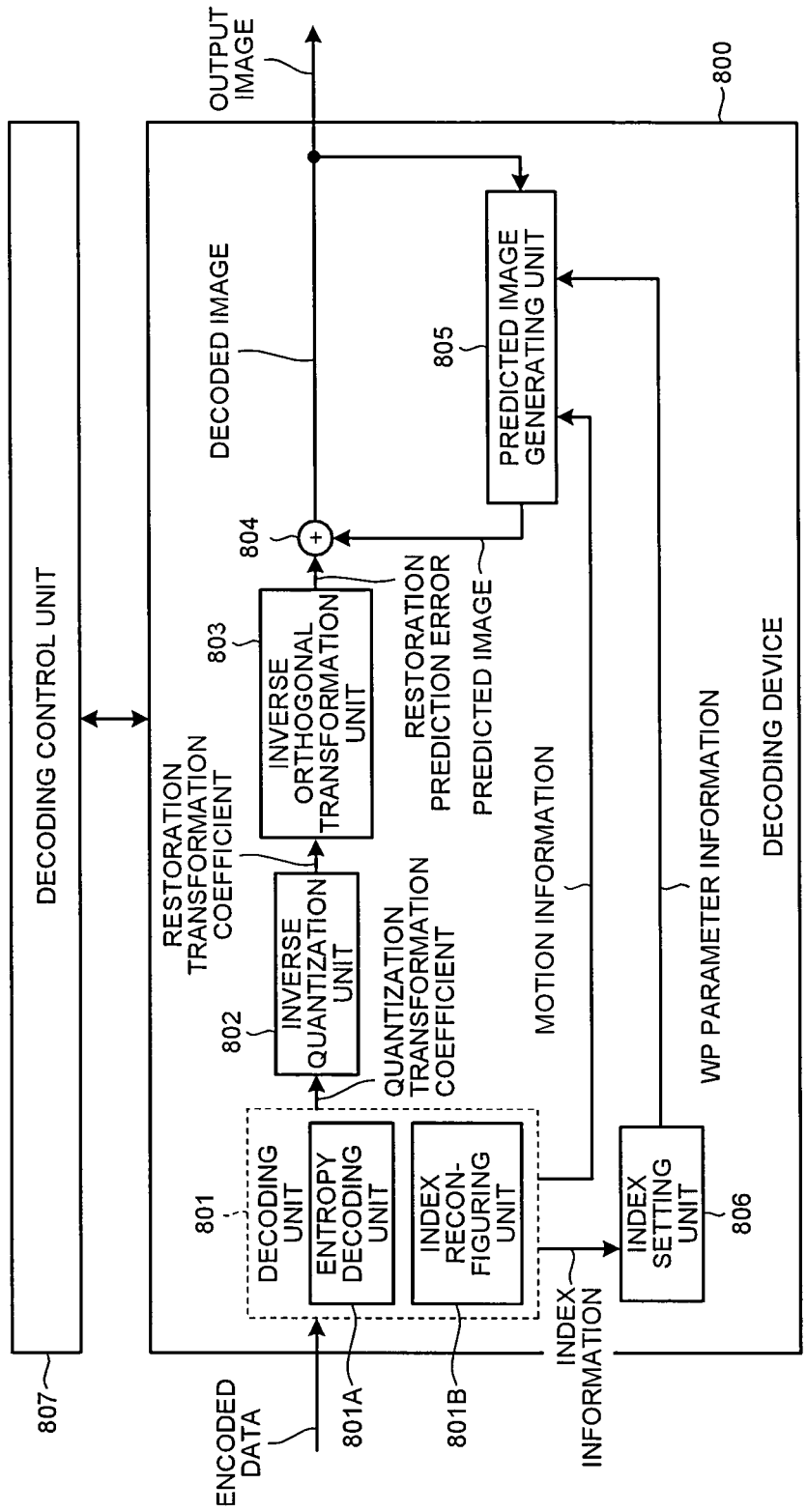
FIG. 24 is a block diagram that illustrates an example of the configuration of a decoding device according to a second embodiment.

FIG. 24 is a block diagram that illustrates an example of the configuration of a decoding device 800 according to the second embodiment.

The decoding device 800 decodes encoded data stored in an input buffer not illustrated in the figure or the like into a decoded image and outputs the decoded image to an output buffer not illustrated in the figure as an output image. The encoded data, for example, is output from the encoding device 100 illustrated in FIG. 1 or the like and is input to the decoding device 800 through a storage system, a transmission system, a buffer, or the like not illustrated in the figure.

The decoding device 800, as illustrated in FIG. 24, includes: a decoding unit 801, an inverse quantization unit 802; an inverse orthogonal transformation unit 803; an addition unit 804; a predicted image generating unit 805; and an index setting unit 806. The inverse quantization unit 802, the inverse orthogonal transformation unit 803, the addition unit 804, and the predicted image generating unit 805 are elements that are substantially the same as or similar to the inverse quantization unit 104, the inverse orthogonal transformation unit 105, the addition unit 106, and the predicted image generating unit 107 illustrated FIG. 1. In addition, a decoding control unit 807 illustrated in FIG. 24 controls the decoding device 800 and, for example, is realized by a CPU or the like.

In order to decode encoded data, the decoding unit 801 performs decoding based on the syntax for each frame or each field. The decoding unit 801 includes an entropy decoding unit 801A and an index reconfiguring unit 801B.

The entropy decoding unit 801A sequentially performs entropy decoding of a code string of each syntax and regenerates motion information including a prediction mode, a motion vector, and a reference number, index information used for predicting a weighted motion compensated prediction, and encoding parameters of an encoding target block such as a quantization transformation coefficient and the like. Here, the encoding parameters are all the parameters that are necessary for decoding information relating to a transformation coefficient, information relating to quantization, and the like in addition to those described above.

More specifically, the entropy decoding unit 801A has a function for performing a decoding process such as a variable-length decoding process or an arithmetic decoding process for input encoded data. For example, in H.264, context based adaptive variable length coding (CAVLC), context based adaptive binary arithmetic coding (CABAC), or the like is used. Such a process is also called a decoding process.

The index reconfiguring unit 801B reconfigures index information by restoring the decoded index information. More specifically, in order to reduce the code length of the syntax elements of the decoded index information, the index reconfiguring unit 801B performs a prediction process in accordance with the characteristics of parameters of the syntax elements, restores the syntax elements, and reconfigures the index information. A specific example of the prediction process will be described later.

The decoding unit 801 outputs the motion information, the index information, and the quantization transformation coefficient, so as to input the quantization transformation coefficient to the inverse quantization unit 802, input the index information to the index setting unit 806, and input the motion information to the predicted image generating unit 805.

The inverse quantization unit 802 performs an inverse quantization process for the quantization transformation coefficient input from the decoding unit 801 and acquires a restoration transformation coefficient. More specifically, the inverse quantization unit 802 performs inverse quantization based on the quantization information used by the decoding unit 801. Described in more detail, the inverse quantization unit 802 multiplies the quantization transformation coefficient by a quantization step size derived based on the quantization information, thereby acquiring a restored transformation coefficient. The inverse quantization unit 802 outputs the restored transformation coefficient so as to be input to the inverse orthogonal transformation unit 803.

The inverse orthogonal transformation unit 803 performs an inverse orthogonal transformation corresponding to the orthogonal transformation performed on the encoding side for the restored transformation coefficient input from the inverse quantization unit 802, thereby acquiring a restored prediction error. The inverse orthogonal transformation unit 803 outputs the restored prediction error so as to be input to the addition unit 804.

The addition unit 804 adds the restored prediction error input from the inverse orthogonal transformation unit 803 and a corresponding predicted image, thereby generating a decoded image. The addition unit 804 outputs the decoded image so as to be input to the predicted image generating unit 805. In addition, the addition unit 804 outputs the decoded image to the outside as an output image. Thereafter, the output image is temporarily stored in an external output buffer not illustrated in the figure or the like and is output to a display device system such as a display or a monitor not illustrated in the figure or a video device system, for example, at output timing managed by the decoding control unit 807.

The index setting unit 806 receives the index information input from the decoding unit 801, converts the index information into WP parameter information, and outputs the WP parameter information so as to be input to the predicted image generating unit 805. More specifically, the index setting unit 806 receives the index information that has been processed to be decoded by the entropy decoding unit 801A and is reconfigured by the index reconfiguring unit 801B. Then, the index setting unit 806 checks a list of reference images and a reference number, converts the index information into WP parameter information, and outputs the converted WP parameter information to the predicted image generating unit 805. The WP parameter information has already been described with reference to FIGS. 8A and 8B, and thus, description thereof will not be presented.

The predicted image generating unit 805 generates a predicted image 815 by using the motion information input from the decoding unit 801, the WP parameter information input from the index setting unit 806, and the decoded image input from the addition unit 804.

Here, the predicted image generating unit 805 will be described in detail with reference to FIG. 4. The predicted image generating unit 805, similarly to the predicted image generating unit 107, includes: a multi-frame motion compensation unit 201; a memory 202; a single-directional motion compensation unit 203; a prediction parameter control unit 204; a reference image selector 205; a frame memory 206; and a reference image control unit 207.

The frame memory 206 stores the decoded image input from the addition unit 106 as a reference image under the control of the reference image control unit 207. The frame memory 206 includes a plurality of memory sets FM1 to FMN (here, N≥2) used for temporarily storing the reference image.

The prediction parameter control unit 204 prepares a plurality of combinations each of a reference image number and a prediction parameter as a table based on the motion information input from the decoding unit 801. Here, the motion information represents information of a motion vector representing the deviation of a motion that is used for the motion compensated prediction, the reference image number, and a prediction mode such as a single-directional/bidirectional prediction. The prediction parameter represents information relating to the motion vector and the prediction mode. Then, the prediction parameter control unit 204 selects a combination of a reference image number and a prediction parameter used for generating a predicted image based on the motion information and outputs the selected combination so as to allow the reference image number to be input to the reference image selector 205 and allow the prediction parameter to be input to the single-directional motion compensation unit 203.

The reference image selector 205 is a switch that changes one of output terminals of the frame memories FM1 to FMN, which are included in the frame memory 206, to be connected to based on a reference image number input from the prediction parameter control unit 204. For example, when the reference image number is "0", the reference image selector 205 connects the output terminal of the frame memory FM1 to the output terminal of the reference image selector 205, and, when the reference image number is N−1, the reference image selector 205 connects the output termi-nal of the frame memory FMN to the output terminal of the reference image selector 205. The reference image selector 205 outputs a reference image stored in the frame memory of which the output terminal is connected thereto from among the frame memories FM1 to FMN included in the frame memory 206 so as to be input to the single-directional motion compensation unit 203. In the decoding device 800, the reference image is not used by any unit other than the predicted image generating unit 805, and accordingly, the reference image may not be output to the outside of the predicted image generating unit 805.

The single-directional predicted motion compensation unit 203 performs a motion compensated prediction process based on the prediction parameter input from the prediction parameter control unit 204 and the reference image input from the reference image selector 205, thereby generating a single-directional predicted image. The motion compensated prediction has already been described with reference to FIG. 5, and thus, description thereof will not be presented.

The single-directional predicted motion compensation unit 203 outputs a single-directional predicted image and temporarily stores the single-directional predicted image in the memory 202. Here, in a case where the motion information (prediction parameter) represents a bidirectional prediction, the multi-frame motion compensation unit 201 makes a weighted prediction using two types of single-directional predicted images. Accordingly, the single-directional predicted motion compensation unit 203 stores a single-directional predicted image corresponding to the first type in the memory 202 and directly outputs a single-directional predicted image corresponding to the second type to the multi-frame motion compensation unit 201. Here, the single-directional predicted image corresponding to the first type will be referred to as a first predicted image, and the single-directional predicted image corresponding to the second type will be referred to as a second predicted image.

In addition, two single-directional motion compensation units 203 may be prepared and generate two single-directional predicted images. In such a case, when the motion information (prediction parameter) represents a single-directional prediction, the single-directional motion compensation unit 203 may directly output the first single-directional predicted image to the multi-frame motion compensation unit 201 as a first predicted image.

The multi-frame motion compensation unit 201 makes a weighted prediction by using the first predicted image input from the memory 202, the second predicted image input from the single-directional predicted motion compensation unit 203, and the WP parameter information input from the motion evaluating unit 109, thereby generating a predicted image. The multi-frame motion compensation unit 201 outputs the predicted image so as to be input to the addition unit 804.

Here, the multi-frame motion compensation unit 201 will be described in detail with reference to FIG. 6. Similarly to the predicted image generating unit 107, the multi-frame motion compensation unit 201 includes: a default motion compensation unit 301; a weighted motion compensation unit 302; a WP parameter control unit 303; and WP selectors 304 and 305.

The WP parameter control unit 303 outputs a WP application flag and weighting information based on the WP parameter information input from the index setting unit 806 so as to input the WP application flag to the WP selectors 304 and 305 and input the weighting information to the weighted motion compensation unit 302.

Here, the WP parameter information includes information of the fixed point precision of the weighting factor, a first WP application flag, a first weighting factor, and a first offset corresponding to the first predicted image, and a second WP application flag, a second weighting factor, and a second offset corresponding to the second predicted image. The WP application flag is a parameter that can be set for each corresponding reference image and signal component and represents whether or not a weighted motion compensation prediction is made. The weighting information includes information of the fixed point precision of the weighting factor, the first weighting factor, the first offset, the second weighting factor, and the second offset. Here, the WP parameter information represents the same information as that of the first embodiment.

Described in detail, when the WP parameter information is input from the index setting unit 806, the WP parameter control unit 303 outputs the WP parameter information with being divided into the first WP application flag, the second WP application flag, and the weighting information, thereby inputting the first WP application flag to the WP selector 304, inputting the second WP application flag to the WP selector 305, and inputting the weighting information to the weighted motion compensation unit 302.

The WP selectors 304 and 305 change the connection ends of the predicted images based on the WP application flags input from the WP parameter control unit 303. In a case where the corresponding WP application flag is "0", each one of the WP selectors 304 and 305 connects the output end thereof to the default motion compensation unit 301. Then, the WP selectors 304 and 305 output the first and second predicted images so as to be input to the default motion compensation unit 301. On the other hand, in a case where the corresponding WP application flag is "1", each one of the WP selectors 304 and 305 connects the output end thereof to the weighted motion compensation unit 302. Then, the WP selectors 304 and 305 output the first and second predicted images so as to be input to the weighted motion compensation unit 302.

The default motion compensation unit 301 performs average processing based on the two single-directional predicted images (the first and second predicted images) input from the WP selectors 304 and 305, thereby generating a predicted image. More specifically, in a case where the first and second WP application flags are "0"s, the default motion compensation unit 301 performs average processing based on Numerical Expression (1).

In addition, in a case where the prediction mode represented by the motion information (prediction parameter) is the single-directional prediction, the default motion compensation unit 301 calculates a final predicted image using only the first predicted image based on Numerical Expression (4).

The weighted motion compensation unit 302 performs weighted motion compensation based on the two single-directional predicted images (the first and second predicted images) input from the WP selectors 304 and 305 and the weighting information input from the WP parameter control unit 303. More specifically, the weighted motion compensation unit 302 performs the weighting process based on Numerical Expression (7) in a case where the first and second WP application flags are "1"s.

In addition, in a case where the calculation precision of the first and second predicted images and the calculation precision of the predicted image are different from each other, the weighted motion compensation unit 302 realizes a rounding process by controlling log $WD_C$, which is fixed point precision, as in Numerical Expression (8).

In addition, in a case where the prediction mode represented by the motion information (prediction parameter) is a single directional prediction, the weighted motion compensation unit 302 calculates a final predicted image using only the first predicted image based on Numerical Expression (9).

In addition, in a case where the calculation precision of the first and second predicted images and the calculation precision of the predicted image are different from each other, the weighted motion compensation unit 302 realizes a rounding process by controlling log $WD_C$, which is fixed point precision, as in Numerical Expression (8), similarly to the case of the bidirectional prediction.

The fixed point precision of the weighting factor has already been described with reference to FIG. 7, and thus, description thereof will not be presented. In addition, in the case of a single directional prediction, various parameters (the second WP application flag, the second weighting factor, and the second offset information) corresponding to the second predicted image are not used and may be set to initial values determined in advance.

The decoding unit 801 uses syntax 500 represented in FIG. 9. The syntax 500 represents the structure of encoded data that is a decoding target of the decoding unit 801. The syntax 500 has already been described with reference to FIG. 9, and thus, description thereof will not be presented. In addition, the picture parameter set syntax 505 has been described with reference to FIG. 10 except that decoding is used instead of encoding, and thus, description thereof will not be presented. Furthermore, the slice header syntax 507 has already been described with reference to FIG. 11 except that decoding is used instead of encoding, and thus, description thereof will not be presented. In addition, the pred weight table syntax 508 has already been described with reference to FIG. 12 except that decoding is used instead of encoding, and thus, description thereof will not be presented.

Here, a method of predicting each syntax element relating to the weighted prediction in the syntax configuration will be described in detail. The prediction of the syntax element is performed by the index reconfiguring unit 801B. The syntax configuration explicitly representing the prediction method according to the second embodiment is the same as that of the second embodiment and is as illustrated in FIG. 13.

In the inter-signal prediction method of Luma_log 2_weight_denom and chroma_log 2_weight_denom representing the fixed point precision of the weighting factor, a restoration process is performed using Numerical Expression (11). The details of the restoration process are as illustrated in FIG. 15.

In the prediction method of luma_weight_lx[i] and chroma_weight_lx[i] [j] representing weighting factors of the luminance and the color difference signal, a restoration process is performed using Numerical Expressions (14) and (17). Details of the restoration process are as illustrated in FIG. 17.

In the prediction method in which predicted values of the weighting factors (luma_weight_lx[i] and chroma_weight_lx[i] [j]) of the luminance and the color difference signal are derived with other reference numbers or other POC numbers, a restoration process is performed using Numerical Expressions (19) and (21). Details of the restoration process are as illustrated in FIG. 19.

In the prediction method in which predicted values of the weighting factors (luma_weight_lx[i] and chroma_weight_ lx[i] [j]) of the luminance and the color difference signal are derived using a distance between an encoding target and the reference slice, a restoration process is performed using Numerical Expressions (23) and (25). Details of the restoration process are the same as those of the flowchart illustrated in FIG. 19 by introducing the (i−1)-th value (i≠0) into baseidx.

In the technique for deriving predicted values of the weighting factor and the fixed point precision using the method of deriving a WP parameter of the implicit weighted prediction defined in H.264 and the like, a restoration process is performed using Numerical Expressions (31) and (33). Details of the restoration process are as illustrated in FIG. 23.

A plurality of the prediction techniques described above may not only be used independently but also be used in a combined manner. For example, by combining Numerical Expressions (11), (14), (17), and (28), it is possible to efficiently reduce the code amount of syntax elements of the index information.

As above, according to the second embodiment, the decoding device 800 eliminates the spatial redundancy using the correlation between parameters of the information to be encoded, whereby a problem of decreasing the coding efficiency is solved. The decoding device 800 can reduce the code amount compared to that of a conventional configuration in which syntax elements used in the weighted motion compensation prediction are directly (direct values) encoded.

Modification

In the first and second embodiments described above, an example has been described in which the frame is divided into rectangular blocks each having a size of 16×16 pixels or the like and is encoded/decoded in order from an upper left block of the screen toward the lower right block (see FIG. 2). However, the encoding order and the decoding order are not limited to those illustrated in this example. For example, the encoding and the decoding may be performed in order from the lower right side toward the upper left side, or the encoding and the decoding may be performed so as to draw a whirlpool from the center of the screen toward the end of the screen. In addition, the encoding and the decoding may be performed in order from the upper right side toward the lower left side, or the encoding and the decoding may be performed so as to draw a whirlpool from the end of the screen toward the center of the screen. In such a case, since the position of an adjacent pixel block that can be referred to in accordance with the encoding order changes, the position may be changed to an appropriately usable position.

In the first and second embodiments described above, while the description has been presented with the size of a prediction target block such as a 4×4 pixel block, a 8×8 pixel block, a 16×16 pixel block or the like being illustrated as an example, the prediction target block may not have a uniform block shape. For example, the size of the prediction target bock may be a 16×8 pixel block, a 8×16 pixel block, a 8×4 pixel block, a 4×8 pixel block, or the like. In addition, it is not necessary to uniformize all the block sizes within one coding tree block, and a plurality of block sizes different from each other may be mixed. In a case where a plurality of block sizes different from each other are mixed within one coding tree block, the code amount for encoding or decoding division information increases in accordance with an increase in the number of divisions. Thus, it is preferable to select a block size in consideration of the balance between the code amount of the division information and the quality of a local encoded image or a decoded image.

In the first and second embodiments described above, for the simplification, a comprehensive description has been presented for a color signal component without the prediction processes of the luminance signal and the color difference signal not being differentiated from each other. However, in a case where the prediction processes of the luminance signal and the color difference signal are different from each other, the same prediction method or prediction methods different from each other may be used. In a case where prediction methods different from each other are used for the luminance signal and the color difference signal, encoding or decoding may be performed using the prediction method selected for the color difference signal similarly to that for the luminance signal.

In the first and second embodiments described above, for the simplification, a comprehensive description has been presented for a color signal component without the weighted motion compensated prediction processes of the luminance signal and the color difference signal not being differentiated from each other. However, in a case where the weighted motion compensated prediction processes of the luminance signal and the color difference signal are different from each other, the same weighted motion compensated prediction method or weighted motion compensated prediction methods different from each other may be used. In a case where weighted motion compensated prediction methods different from each other are used for the luminance signal and the color difference signal, encoding or decoding may be performed using the weighted motion compensated prediction method selected for the color difference signal similarly to that for the luminance signal.

In the first and second embodiments described above, between the rows of the table represented in the syntax configuration, a syntax element not defined in this embodiment may be inserted, and a description relating to other conditional branches may be included. Alternatively, a syntax table may be divided into a plurality of tables, or syntax tables may be integrated together. In addition, the same term may not be necessary used, but the term may be arbitrarily changed in accordance with a used form.

As described above, according to each embodiment, the problem of encoding redundant information of the syntax configuration at the time of performing a weighted motion compensation prediction is solved, and the weighted motion compensated prediction process having high efficiency is realized. Therefore, according to each embodiment, the coding efficiency is improved, and subjective image quality is improved.

Figure 25:
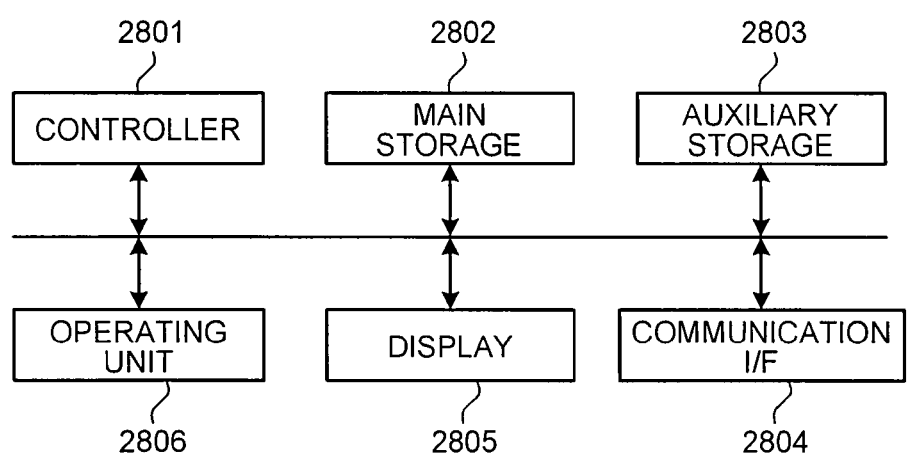
FIG. 25 is a block diagram that illustrates a hardware configuration of a device according to both the first and second embodiments.

Next, a hardware configuration of the device (the encoding device, and the decoding device) according to each embodiment will be described with reference to FIG. 25. FIG. 25 is an explanatory view illustrating a hardware configuration of the device according to each embodiment. The encoding device and the decoding device each comprise a control unit 2801, such as a CPU (Central Processing Unit) which controls the overall device, a main storage 2802, such as a ROM (Read Only Memory) or a RAM (Random Access Memory) which stores various data or programs, an auxiliary storage 2803, such as an HDD (Hard Disk Drive) or a CD (Compact Disk) drive which stores various data or programs, and a bus connecting these elements. This is a hardware configuration utilizing a conventional computer. Further, the encoding device and the decoding device are connected wirelessly or through a wire to a communication I/F (Interface) 2804 which controls communication with an external apparatus, a display 2805 which displays information, and an operating unit 2806, such as a keyboard or a mouse which receives instructions input by the user. Data to be encoded and data to be decoded may be stored in the HDD, or input by the disk drive apparatus, or input externally via the communication I/F 2804.

The hardware configuration shown in FIG. 25 is a mere example. The encoding device and the decoding device of each embodiment may be implemented partly or entirely by an integrated circuit such as an LSI (Large Scale Integration) circuit or an IC (Integrated Circuit) chip set. The functional blocks of the encoding device and the decoding device may be individually formed of a processor, or may be integrated partly or entirely as a processor. Integration of the circuits of the configuration is not limited to LSI, but may be implemented as a dedicated circuit or a general-purpose processor.

While several embodiments of the present invention have been described, such embodiments are presented as examples and are not for the purpose of limiting the scope of the invention. These novel embodiments can be performed in other various forms, and various omissions, substitutions, and changes can be made therein in a range not departing from the concept of the invention. These embodiments and modifications thereof belong to the scope or the concept of the invention and belong to the invention described in the claims and a scope equivalent thereto.

For example, a program realizing the process of each embodiment described above may be provided with being stored in a computer-readable storage medium. As the storage medium, a storage medium that can store a program and can be read by a computer such as a magnetic disk, an optical disc (a CD-ROM, a CD-R, a DVD, or the like), an magneto-optical disk (an MO or the like), or a semiconductor memory may be used regardless of the storage form.

In addition, the program realizing the process of each embodiment may be stored in a computer (server) connected to a network such as the Internet and may be downloaded to a computer (client) through the network.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An encoding device, comprising:
   circuitry configured to:
   set an index that represents information of a reference image, a color difference weighting factor, and an offset of the color difference;
   set a first value to the reference value, wherein the first value is equal to a value of the color difference weighting factor used when a difference of pixel value between the reference image and a target image is less than or equal to a specific value;
   set a second value to the difference value, wherein the difference value is equal to a value of a difference between the color difference weighting factor and the reference value;
   encode the difference value;
   multiply a median value of a maximal brightness value of the color difference by the color difference weighting factor;
   determine a predicted value by using the median value of the color difference, a value obtained by multiplying the median value of the maximal brightness value of the color difference by the color difference weighting factor, and the offset; and
   encode the predicted value.

2. The encoding device according to claim 1, wherein
   the index further represents a fixed point precision of the color difference weighting factor, and
   the circuitry is further configured to predict the reference value according to the fixed point precision.

3. The encoding device according to claim 1, wherein the circuitry is further configured to:
   generate a predicted image of a target block by multiplying a predicted value by the color difference weighting factor, the predicted value being compensated based on a motion vector;
   generate a quantization transformation coefficient of the target block; and
   encode the quantization transformation coefficient and the motion vector.

4. The encoding device according to claim 3, wherein
   the circuitry is further configured to generate the predicted image of the target block by multiplying the predicted value by the color difference weighting factor and adding the offset, the predicted value compensated based on the motion vector.

5. The encoding device according to claim 1, wherein
   the index further represents a luminance weighting factor, a first fixed point precision of the luminance weighting factor, and a second fixed point precision of the color difference weighting factor, and
   the circuitry is further configured to:
   determine a first difference value between the first fixed point precision and the second fixed point precision, and
   encode a second difference value between the first difference value and the first fixed point precision or the second fixed point precision.

6. An encoding method, comprising:
   setting, by circuitry, an index that represents information of a reference image, a color difference weighting factor, and an offset of the color difference;
   setting, by the circuitry, a first value to the reference value, wherein the first value is equal to a value of the color difference weighting factor used when a difference of pixel value between the reference image and a target image is less than or equal to a specific value;
   setting, by the circuitry, a second value to the difference value, wherein the difference value is equal to a value of a difference between the color difference weighting factor and the reference value;
   encoding, by the circuitry, the difference value;
   multiplying, by the circuitry, a median value of a maximal brightness value of the color difference by the color difference weighting factor;
   determining, by the circuitry, a predicted value by using the median value of the color difference, a value obtained by multiplying the median value of the maximal brightness value of the color difference by the color difference weighting factor, and the offset; and
   encoding, by the circuitry, the predicted value.

7. The encoding device according to claim 1, wherein the circuitry is further configured to generate a predicted image of a target block by multiplying a predicted value by the color difference weighting factor and adding the offset, the predicted value compensated based on a motion vector.

8. The encoding method according to claim 6, wherein the index further represents a fixed point precision of the color difference weighting factor, and the method further comprises:
predicting, by the circuitry, the reference value according to the fixed point precision.

9. The encoding method according to claim 6, further comprising:
generating, by the circuitry, a predicted image of a target block by multiplying a predicted value by the color difference weighting factor, the predicted value being compensated based on a motion vector;
generating, by the circuitry, a quantization transformation coefficient of the target block; and
encoding, by the circuitry, the quantization transformation coefficient and the motion vector.

10. The encoding method according to claim 9, further comprising:
generating, by the circuitry, the predicted image of the target block by multiplying the predicted value by the color difference weighting factor and adding the offset, the predicted value compensated based on the motion vector.

11. The encoding method according to claim 6, wherein the index further represents a luminance weighting factor, a first fixed point precision of the luminance weighting factor, and a second fixed point precision of the color difference weighting factor, and
the method further comprises:
determining, by the circuitry, a first difference value between the first fixed point precision and the second fixed point precision, and
encoding, by the circuitry, a second difference value between the first difference value and the first fixed point precision or the second fixed point precision.

12. A non-transitory computer readable medium storing computer executable instructions that, when executed by circuitry of a computer, cause the circuitry of the computer to:
set an index that represents information of a reference image, a color difference weighting factor, and an offset of the color difference;
set a first value to the reference value, wherein the first value is equal to a value of the color difference weighting factor used when a difference of pixel value between the reference image and a target image is less than or equal to a specific value;
set a second value to the difference value, wherein the difference value is equal to a value of a difference between the color difference weighting factor and the reference value;
encode the difference value;
multiply a median value of a maximal brightness value of the color difference by the color difference weighting factor;
determine a predicted value by using the median value of the color difference, a value obtained by multiplying the median value of the maximal brightness value of the color difference by the color difference weighting factor, and the offset; and
encode the predicted value.

13. The non-transitory computer readable medium according to claim 12, wherein
the index further represents a fixed point precision of the color difference weighting factor, and
the executable instructions further cause the circuitry to predict the reference value according to the fixed point precision.

14. The non-transitory computer readable medium according to claim 12, wherein the executable instructions further cause the circuitry to:
generate a predicted image of a target block by multiplying a predicted value by the color difference weighting factor, the predicted value being compensated based on a motion vector;
generate a quantization transformation coefficient of the target block; and
encode the quantization transformation coefficient and the motion vector.

15. The non-transitory computer readable medium according to claim 14, wherein
the executable instructions further cause the circuitry to generate the predicted image of the target block by multiplying the predicted value by the color difference weighting factor and adding the offset, the predicted value compensated based on the motion vector.

16. The non-transitory computer readable medium according to claim 12, wherein
the index further represents a luminance weighting factor, a first fixed point precision of the luminance weighting factor, and a second fixed point precision of the color difference weighting factor, and
the executable instructions further cause the circuitry to:
determine a first difference value between the first fixed point precision and the second fixed point precision, and
encode a second difference value between the first difference value and the first fixed point precision or the second fixed point precision.

17. The encoding method according to claim 6, further comprising:
generating, by the circuitry, a target block by multiplying a predicted value by the color difference weighting factor and adding the offset, the predicted value compensated based on a motion vector.

* * * * *